United States Patent
Gelbman et al.

(10) Patent No.: US 7,791,489 B2
(45) Date of Patent: Sep. 7, 2010

(54) ELECTRONIC-INK BASED RFID TAG FOR ATTACHMENT TO A CONSUMER ITEM AND DISPLAYING GRAPHICAL INDICIA INDICATING WHETHER OR NOT SAID CONSUMER ITEMS HAS BEEN READ AND ITS INTEGRATED RFID MODULE HAS BEEN ACTIVATED OR DEACTIVATED

(75) Inventors: Alexander Gelbman, West Orange, NJ (US); Charles Forbes, Vineland, NJ (US)

(73) Assignee: Metrologic Instruments, Inc., Blackwood, NJ (US)

(*) Notice: Subject to any disclaimer, the term of this patent is extended or adjusted under 35 U.S.C. 154(b) by 0 days.

(21) Appl. No.: 12/074,700

(22) Filed: Mar. 5, 2008

(65) Prior Publication Data

US 2008/0303637 A1    Dec. 11, 2008

Related U.S. Application Data

(63) Continuation of application No. 10/934,866, filed on Sep. 3, 2004, now abandoned.

(60) Provisional application No. 60/499,334, filed on Sep. 3, 2003.

(51) Int. Cl.
| | |
|---|---|
| G08B 29/00 | (2006.01) |
| G08B 13/14 | (2006.01) |
| H04Q 5/22 | (2006.01) |
| G06F 17/00 | (2006.01) |
| G06K 19/06 | (2006.01) |
| G09G 5/00 | (2006.01) |
| G09G 3/34 | (2006.01) |

(52) U.S. Cl. .............. 340/572.8; 340/10.42; 340/572.1; 340/572.7; 340/5.1; 340/5.92; 235/375; 235/383; 235/385; 235/492; 345/4; 345/5; 345/85; 345/87; 345/205

(58) Field of Classification Search .............. 340/10.42, 340/572.1, 572.7, 572.8, 5.91, 5.92; 345/4, 345/5, 85, 87, 205

See application file for complete search history.

(56) References Cited

U.S. PATENT DOCUMENTS 3,668,106 A    6/1972    Ota (Continued)

FOREIGN PATENT DOCUMENTS

WO    WO 94/23381    10/1994

(Continued)

OTHER PUBLICATIONS

Baeuerle, R. et al., "A MIM-Driven Transmission Display with Color Filters on 2-in.-Diagonal Plastic Substrates," SID 99 Digest, vol. 14 (1999).

(Continued)

*Primary Examiner*—Benjamin C Lee
*Assistant Examiner*—Lam P Pham
(74) *Attorney, Agent, or Firm*—Thomas J. Perkowski, Esq., P.C.

(57) ABSTRACT

An electronic-ink based RFID tag for attachment to a consumer item and displaying graphical indicia indicating whether or not the item has been read and its integrated RFID module has been activated or deactivated. In response to privacy concerns of consumers, the present invention provides new way of and means for allowing a consumer to readily determine the state of an RFID tag on a consumer item (i.e. activated or deactivated) through the use of a visual indicator integrated with the electronic-ink based RFID tag. The RFID tag has an addressable display label employing a layer of electronic ink, for displaying a first visual indicator when its RFID module has been activated to indicate that the unique identifier associated consumer item has not yet be read, and a second visual indicator when the RFID module has been deactivated to indicate that the unique identifier associated the consumer item has been read.

22 Claims, 13 Drawing Sheets

U.S. PATENT DOCUMENTS

| | | | |
|---|---|---|---|
| 3,756,693 A | 9/1973 | Ota | |
| 3,792,308 A | 2/1974 | Ota | |
| 3,892,568 A | 7/1975 | Ota | |
| 4,002,886 A | 1/1977 | Sundelin | |
| 4,093,534 A | 6/1978 | Carter et al. | |
| 4,126,854 A | 11/1978 | Sheridon | |
| 4,139,149 A | 2/1979 | Crepeau et al. | |
| 4,143,103 A | 3/1979 | Sheridon | |
| 4,211,668 A | 7/1980 | Tate | |
| 4,218,302 A | 8/1980 | Dalisa et al. | |
| 4,272,596 A | 6/1981 | Harbour et al. | |
| 4,298,448 A | 11/1981 | Muller et al. | |
| 4,336,536 A | 6/1982 | Kalt et al. | |
| 4,419,383 A | 12/1983 | Lee | |
| 4,435,047 A | 3/1984 | Fergason | |
| 4,500,880 A | 2/1985 | Gomersall et al. | |
| 4,522,472 A | 6/1985 | Liebert et al. | |
| 4,640,583 A | 2/1987 | Hoshikawa et al. | |
| 4,654,514 A | 3/1987 | Watson et al. | |
| 4,655,897 A | 4/1987 | DiSanto et al. | |
| 4,742,345 A | 5/1988 | DiSanto et al. | |
| 4,746,917 A | 5/1988 | DiSanto et al. | |
| 4,766,295 A | 8/1988 | Davis et al. | |
| 4,789,858 A | 12/1988 | Fergason et al. | |
| 4,937,586 A | 6/1990 | Stevems et al. | |
| 4,948,232 A | 8/1990 | Lange | |
| 4,973,952 A | 11/1990 | Malec et al. | |
| 5,057,363 A | 10/1991 | Nakanishi | |
| 5,111,196 A | 5/1992 | Hunt | |
| 5,167,508 A | 12/1992 | McTaggart | |
| 5,172,314 A | 12/1992 | Poland et al. | |
| 5,213,853 A | 5/1993 | Noonan | |
| 5,216,530 A | 6/1993 | Pearlman et al. | |
| 5,220,316 A | 6/1993 | Kazan | |
| 5,250,388 A | 10/1993 | Schoch, Jr. et al. | |
| 5,262,098 A | 11/1993 | Crowley et al. | |
| 5,323,150 A | 6/1994 | Tuttle | |
| 5,344,594 A | 9/1994 | Sheridon | |
| 5,361,871 A | 11/1994 | Gupta et al. | |
| 5,382,784 A | 1/1995 | Eberhardt | |
| 5,401,947 A | 3/1995 | Poland | |
| 5,412,192 A | 5/1995 | Hoss | |
| 5,437,811 A | 8/1995 | Doane et al. | |
| 5,442,343 A | 8/1995 | Cato et al. | |
| 5,445,906 A | 8/1995 | Hobson et al. | |
| 5,446,465 A | 8/1995 | Diefes et al. | |
| 5,448,226 A | 9/1995 | Failing, Jr. et al. | |
| 5,465,085 A | 11/1995 | Caldwell et al. | |
| 5,467,474 A | 11/1995 | Ackerman et al. | |
| 5,473,146 A | 12/1995 | Goodwin, III | |
| 5,485,176 A | 1/1996 | Ohara et al. | |
| 5,504,475 A | 4/1996 | Houdou et al. | |
| 5,504,492 A | 4/1996 | Class et al. | |
| 5,537,126 A | 7/1996 | Kayser et al. | |
| 5,537,312 A | 7/1996 | Sekiguchi et al. | |
| 5,539,393 A | 7/1996 | Barfod | |
| 5,548,282 A | 8/1996 | Escritt et al. | |
| 5,571,741 A | 11/1996 | Leedy | |
| 5,572,653 A | 11/1996 | DeTemple et al. | |
| 5,575,554 A | 11/1996 | Guritz | |
| 5,583,819 A | 12/1996 | Roesner et al. | |
| 5,604,027 A | 2/1997 | Sheridon | |
| 5,632,010 A | 5/1997 | Briechle et al. | |
| 5,641,974 A | 6/1997 | den Boer et al. | |
| 5,680,185 A | 10/1997 | Kobayashi et al. | |
| 5,682,143 A | 10/1997 | Brady et al. | |
| 5,686,888 A | 11/1997 | Welles, II et al. | |
| 5,698,833 A | 12/1997 | Skinger | |
| 5,704,049 A | 12/1997 | Briechle | |
| 5,710,830 A | 1/1998 | Holeva | |
| 5,715,622 A | 2/1998 | Giordano, Jr. | |
| 5,729,242 A | 3/1998 | Margerum et al. | |
| 5,736,967 A | 4/1998 | Kayser et al. | |
| 5,737,423 A | 4/1998 | Manduley | |
| 5,745,775 A | 4/1998 | Ahlm et al. | |
| 5,751,257 A | 5/1998 | Sutherland | |
| 5,764,221 A | 6/1998 | Willard | |
| 5,768,217 A | 6/1998 | Sonoda et al. | |
| 5,776,803 A | 7/1998 | Young | |
| 5,777,903 A | 7/1998 | Piosenka et al. | |
| 5,779,839 A | 7/1998 | Tuttle et al. | |
| 5,786,626 A | 7/1998 | Brady et al. | |
| 5,786,875 A | 7/1998 | Brader et al. | |
| 5,793,029 A | 8/1998 | Goodwin, III | |
| 5,793,030 A | 8/1998 | Kelly, Jr. | |
| 5,794,211 A | 8/1998 | Goodwin, III et al. | |
| 5,796,121 A | 8/1998 | Gates | |
| 5,817,207 A | 10/1998 | Leighton | |
| 5,818,528 A | 10/1998 | Roth et al. | |
| 5,825,529 A | 10/1998 | Crowley | |
| 5,828,315 A | 10/1998 | Goodwin, III | |
| 5,828,432 A | 10/1998 | Shashidhar et al. | |
| 5,835,377 A | 11/1998 | Bush | |
| 5,841,365 A | 11/1998 | Rimkus | |
| 5,847,798 A | 12/1998 | Yang et al. | |
| 5,850,187 A | 12/1998 | Carrender et al. | |
| 5,856,858 A | 1/1999 | Carey et al. | |
| 5,861,817 A | 1/1999 | Palmer et al. | |
| 5,864,325 A | 1/1999 | Briechle et al. | |
| 5,872,552 A | 2/1999 | Gordon, II et al. | |
| 5,880,451 A | 3/1999 | Smith et al. | |
| 5,892,543 A | 4/1999 | Zheng et al. | |
| 5,900,610 A | 5/1999 | Kelly, Jr. | |
| 5,907,143 A | 5/1999 | Goodwin, III | |
| 5,910,789 A | 6/1999 | Vigen | |
| 5,914,670 A | 6/1999 | Goodwin, III et al. | |
| 5,918,212 A | 6/1999 | Goodwin, III | |
| 5,923,286 A | 7/1999 | Divakaruni | |
| 5,926,132 A | 7/1999 | Brenner | |
| 5,926,797 A | 7/1999 | Goodwin, III | |
| 5,929,770 A | 7/1999 | Faita | |
| 5,930,026 A | 7/1999 | Jacobson et al. | |
| 5,931,764 A | 8/1999 | Freeman et al. | |
| 5,942,978 A | 8/1999 | Shafer | |
| 5,945,920 A | 8/1999 | Maletsky | |
| 5,949,335 A | 9/1999 | Maynard | |
| 5,955,951 A | 9/1999 | Wischerop et al. | |
| 5,963,133 A | 10/1999 | Monjo | |
| 5,969,672 A | 10/1999 | Brenner | |
| 5,977,998 A | 11/1999 | Briechle et al. | |
| 6,012,040 A | 1/2000 | Goodwin, III | |
| 6,017,584 A | 1/2000 | Albert et al. | |
| 6,019,286 A | 2/2000 | Li et al. | |
| 6,025,896 A | 2/2000 | Hattori et al. | |
| 6,026,373 A | 2/2000 | Goodwin, III | |
| 6,027,958 A | 2/2000 | Vu et al. | |
| 6,047,263 A | 4/2000 | Goodwin, III | |
| 6,049,781 A | 4/2000 | Forrest et al. | |
| 6,054,973 A | 4/2000 | Hughes et al. | |
| 6,055,091 A | 4/2000 | Sheridon et al. | |
| 6,061,107 A | 5/2000 | Yang et al. | |
| 6,073,843 A | 6/2000 | Goodwin, III et al. | |
| 6,076,071 A | 6/2000 | Freeny, Jr. | |
| 6,078,251 A | 6/2000 | Landt et al. | |
| 6,080,606 A | 6/2000 | Gleskova et al. | |
| 6,087,196 A | 7/2000 | Sturm et al. | |
| 6,089,453 A | 7/2000 | Kayser et al. | |
| 6,094,642 A | 7/2000 | Stephenson | |
| 6,105,004 A | 8/2000 | Halperin et al. | |
| 6,105,290 A | 8/2000 | Coates et al. | |
| 6,118,426 A | 9/2000 | Albert et al. | |
| 6,124,851 A | 9/2000 | Jacobson | |
| 6,124,947 A | 9/2000 | Seo | |
| 6,140,899 A | 10/2000 | Kayser et al. | |

| | | |
|---|---|---|
| 6,146,716 A | 11/2000 | Narang |
| 6,147,606 A | 11/2000 | Duan |
| 6,147,791 A | 11/2000 | Sheridon |
| 6,151,096 A | 11/2000 | McDonnell et al. |
| 6,154,190 A | 11/2000 | Yang et al. |
| 6,166,638 A | 12/2000 | Brady et al. |
| 6,169,483 B1 | 1/2001 | Ghaffari et al. |
| 6,173,165 B1 | 1/2001 | Rühl et al. |
| 6,181,299 B1 | 1/2001 | Frederick et al. |
| 6,204,806 B1 | 3/2001 | Hoech |
| 6,204,902 B1 | 3/2001 | Kim et al. |
| 6,222,513 B1 | 4/2001 | Howard et al. |
| 6,232,870 B1 | 5/2001 | Garber et al. |
| 6,236,735 B1 | 5/2001 | Bjorner et al. |
| 6,253,190 B1 | 6/2001 | Sutherland |
| 6,264,106 B1 | 7/2001 | Bridgelall |
| 6,269,173 B1 | 7/2001 | Hsien |
| 6,269,342 B1 | 7/2001 | Brick et al. |
| 6,286,762 B1 | 9/2001 | Reynolds et al. |
| 6,307,751 B1 | 10/2001 | Bodony et al. |
| 6,318,636 B1 | 11/2001 | Reynolds et al. |
| 6,332,098 B2 | 12/2001 | Ross et al. |
| 6,348,908 B1 | 2/2002 | Richley et al. |
| 6,352,349 B1 | 3/2002 | Braginsky et al. |
| 6,354,493 B1 | 3/2002 | Mon |
| 6,379,058 B1 | 4/2002 | Petteruti et al. |
| 6,401,074 B1 | 6/2002 | Sleeper |
| 6,406,249 B1 | 6/2002 | McAdams et al. |
| 6,415,978 B1 | 7/2002 | McAllister |
| 6,415,982 B2 | 7/2002 | Bridhelall et al. |
| 6,429,776 B1 | 8/2002 | Alicot et al. |
| 6,438,882 B1 | 8/2002 | Reynolds |
| 6,466,846 B2 | 10/2002 | Maynard |
| 6,473,072 B1 | 10/2002 | Comiskey et al. |
| 6,474,927 B1 | 11/2002 | McAdams et al. |
| 6,480,182 B2 | 11/2002 | Turner et al. |
| 6,486,780 B1 | 11/2002 | Garber et al. |
| 6,499,103 B1 | 12/2002 | Tsuria et al. |
| 6,502,754 B1 | 1/2003 | Bhatia et al. |
| 6,507,279 B2 | 1/2003 | Loof |
| 6,513,016 B1 | 1/2003 | Freeny, Jr. |
| 6,547,137 B1 | 4/2003 | Begelfer et al. |
| 6,557,760 B2 | 5/2003 | Goodwin, III |
| 6,564,189 B1 | 5/2003 | Nycz |
| 6,608,551 B1 | 8/2003 | Anderson et al. |
| 6,626,359 B2 | 9/2003 | Haulk et al. |
| 6,639,578 B1 | 10/2003 | Comiskey et al. |
| 6,662,078 B1 | 12/2003 | Hardgrave et al. |
| 6,672,512 B2 | 1/2004 | Bridgelall |
| 6,677,852 B1 | 1/2004 | Landt |
| 6,690,931 B2 | 2/2004 | Heo |
| 6,700,491 B2 | 3/2004 | Shafer |
| 6,707,376 B1 | 3/2004 | Patterson et al. |
| 6,753,830 B2 * | 6/2004 | Gelbman .................... 345/55 |
| 6,802,659 B2 | 10/2004 | Cremon et al. |
| 6,830,181 B1 | 12/2004 | Bennett |
| 6,838,989 B1 | 1/2005 | Mays et al. |
| 6,912,398 B1 | 6/2005 | Domnitz |
| 6,924,781 B1 * | 8/2005 | Gelbman .................... 345/85 |
| 6,925,447 B2 | 8/2005 | McMenimen et al. |
| 6,975,224 B2 | 12/2005 | Galley, III et al. |
| 7,019,651 B2 | 3/2006 | Hall et al. |
| 7,040,532 B1 | 5/2006 | Taylor et al. |
| 7,119,759 B2 | 10/2006 | Zehner et al. |
| 7,124,881 B2 | 10/2006 | Fee |
| 7,154,447 B2 | 12/2006 | Copeland et al. |
| 7,243,845 B2 | 7/2007 | Cash et al. |
| 7,248,164 B2 | 7/2007 | Regard |
| 7,280,094 B2 | 10/2007 | Albert |
| 7,304,574 B2 | 12/2007 | Romer et al. |
| 7,317,426 B2 | 1/2008 | Copeland et al. |
| 7,380,725 B2 | 6/2008 | McGill |
| 7,385,500 B2 | 6/2008 | Irwin |
| 7,386,472 B1 | 6/2008 | Bogat |
| 7,409,700 B1 | 8/2008 | Watson |
| 7,433,834 B2 | 10/2008 | Joao |
| 7,461,024 B2 | 12/2008 | Montgomery |
| 7,489,244 B2 | 2/2009 | August et al. |
| 7,520,428 B2 | 4/2009 | Ishikawa |
| 7,535,358 B2 | 5/2009 | Crider et al. |
| 7,634,798 B2 | 12/2009 | Watson |
| 2002/0167500 A1 * | 11/2002 | Gelbman .................... 345/204 |
| 2006/0158678 A1 | 7/2006 | Angrick |
| 2008/0201215 A1 | 8/2008 | Lin |

FOREIGN PATENT DOCUMENTS

| | | |
|---|---|---|
| WO | WO 95/23389 | 8/1995 |
| WO | WO 97/04398 | 2/1997 |
| WO | WO 98/03896 | 1/1998 |
| WO | WO 98/04953 | 2/1998 |
| WO | WO 98/13804 | 4/1998 |
| WO | WO 98/13805 | 4/1998 |
| WO | WO 98/19208 | 5/1998 |
| WO | WO 98/35243 | 8/1998 |
| WO | WO 98/41898 | 9/1998 |
| WO | WO 98/41899 | 9/1998 |
| WO | WO 99/10769 | 3/1999 |
| WO | WO 99/34251 | 7/1999 |
| WO | WO 00/16189 | 3/2000 |
| WO | WO 00/26761 | 5/2000 |
| WO | WO 00/36465 | 6/2000 |
| WO | WO 00/36666 | 6/2000 |
| WO | WO 00/46854 | 8/2000 |
| WO | WO 00/49421 | 8/2000 |
| WO | WO 00/49658 | 8/2000 |
| WO | WO 00/52671 | 9/2000 |
| WO | WO 00/55915 | 9/2000 |
| WO | WO 00/55916 | 9/2000 |
| WO | WO 00/67327 | 11/2000 |
| WO | WO 01/07961 | 2/2001 |
| WO | WO 01/08241 | 2/2001 |
| WO | WO 01/08242 | 2/2001 |
| WO | WO 01/17029 | 3/2001 |
| WO | WO 01/17040 | 3/2001 |
| WO | WO 01/17041 | 3/2001 |
| WO | WO 01/33621 | 5/2001 |
| WO | WO 01/80287 | 10/2001 |

OTHER PUBLICATIONS

Chen, Y. et al., "A Conformable Electronic Ink Display using a Foil-Based a-Si TFT Array," SID 01 Digest, pp. 157-159, (2001).

Comiskey, Barrett et al., "An electrophoretic ink for all-printed reflective electronic displays," Nature, vol. 394: 253-255 (1998).

Forbes, C.E. et al., "A Rugged Conformable Backplane Fabricated with an a-Si:H TFT Array on a Polyimide Substrate," SID 02 Digest, pp. 1-4 (2000).

Gleskova, H. et al., "Electrophotographic Patterning of a-Si:H," Mat. Res. Soc. Symp. Proc., vol. 377:719-724 (1995).

Gleskova, H. et al., "Electrophotographic Patterning of Thin-Film Silicon on Glass Foil," IEEE Electron Device Letters, vol. 16(10): 418-420 (1995).

Gleskova, H. et al., "Electrophotographic Patterning of a-SiH," ALMCDs '95 Workshop Proceedings, pp. 16-19 (1995).

Gleskova, H. et al., "Electrophotographically Patterned Thin-Film Silicon Transistors," IEEE Electron Device Letters, vol. 17(6):264-266 (1996).

Gleskova, H. et al., "a-Si:H TFT Fabricated by Electrophotographic Printing," Display Ivianufacturing Technology Conference, pp. 97-98 (1996).

Gleskova, H. et al.. "a-Si:H TFTs Patterned Using Laser-Printed Toner," Mat. Res. Soc. Symp. Proc., vol. 424:71-76 (1997).

Gleskova. H. et al., "a-Si:H TFTs Made on Polyimide Foil by PE-CVD at 150° C.," Mat. Res. Soc. Symp. Proc., vol. 508:73-78 (1998).

Gleskova, H. et al., "Photoresist-free fabrication process for a-Si:H thin film transistors," Journal of Nokrymolids, vol. 227-230:1217-1220 (1998).

Gleskova, H. et al., "Rugged a-Si:H TFTs on Plastic Substrates," Mat. Res. Soc. Symp. Proc., vol. 557: 653-358 (1999).

Gleskova, H. et al., "Amorphous Silicon Thin-Film Transistors on Compliant Polyimide Foil Substrates," IEEE Electron Device Letters. vol. 20(9): 473-475 (1999).

Gleskova, H. et al., "Failure resistance of amorphous silicon transistors under extreme in-plane strain," Applied Physics Letters, vol. 75(19): 3011-3013 (1999).

Gleskova, H. et al., "a-Si:H thin film transistors after very high strain," Journal of Non-Crystalline Solids, vol. 266-269: 1320-1324 (2000).

Gleskova, H. et al., "a-Si:H TFTs on Polyimide Foil: Electrical Performance Under Mechanical Strain," The 21$^{st}$ International Display Research Conference in conjunction with The 8$^{th}$ International Display Workshops, pp. 331-335 (2001).

Gleskova, H. et al., "Low-Temperature silicon nitride for thin-film electronics on ployimide foil substrates," Applied Surface Science, vol. 175-176: 12-16 (2001).

Gleskova, H. et al., "Electrical Stability of a-Si:H TFTs Fabricated at 150° C.," Mat. Res. Soc. Symp. Proc., vol. 664 (2001).

Gleskova, H. et al., "150° C. Amorphous Silicon Thin-Film Transistor Technology for Polyimide Substrates," Journal of the Electrochemical Society, vol. 148(7): G370-G374 (2001).

Gleskova, Helena et al., "DC-Gate-Bias Stressing of a-Si:H TFTs Fabricated at 150° C. on Polyimide Foil," IEEE Transactions on Electron Devices, vol. 48(8): 1667-1671 (2001).

Gleskova, Helena et al., "Electrophotographically printed insulator," Materials Letters, vol. 52: 150-153 (2002).

Gleskova, H. et al., "Electrical response of amorphous silicon thin-film transistors under mechanical strain," Journal of Applied Physics, vol. 92(10): 6224-6229 (2002).

Gleskova, H. et al., "Effects of Mechanical Strain on Amorphous Silicon Thin-Film Transistors," Mat. Res. Soc. Symp. Proc., vol. 715: 667-677 (2002).

Gleskova, H. et al., "Electron mobility in amorphous silicon thin-film transistors under compressive strain," Applied Physicals Letters, vol. 79(20): 3347-3349 (2001).

Hsu, P.I. et al., "Amorphous Si TFTs on plastically deformed spherical domes," Journal of Non-Crystalline Solids, vol. 299-302: 1355-1359 (2002).

i\Zonov, Andrei et al., "Fabrication of a-Si:H TFTs at 120° C. on Flexible Polyimide Substrates," Mat. Res. Soc. Symp. Proc., vol. 558: 375-381 (2000).

Shen, D.S. et al., "Patterning of a-Si:H by Laser Printing," SID 95 Digest, pp. 587-590 (1995).

Stum, J.C. et al., "Three-Dimensional Electronic Surfaces," Mat. Res. Soc. Symp. Proc., vol. 636 (2001).

Stum, J.C. et al., "Enabling Technologies for Plastic Displays," SPIE, (Aug. 28, 2002).

Suo, Z. et al., "Mechanics of rollable and foldable film-on-foil electronics," Applied Physics Letters, vol. 74(8): 1177-1179 (1999).

Theiss, S.D. et al., "PolySilicon Thin Film Transistors Fabricated at 100° C. on a Flexible Plastic Substrate," IEEE (1998).

Thomasson, D.J.B. et al., "Tri-Kyer a-Si:H TFTs on Polymeric Substrates," pp. 126-127, (1998).

Wagner, Sigurd et al., "Compliant substrates for thin-film transistor backplanes," Proceedings of the SPIE, vol. 3636: 32-39 (1999).

Wagner, Sigurd et al., "Low Temperature Amorphous and Nanocrystalline Silicon Technology for Flat Panel Displays," International Display Research Conference, pp. 402-405 (2000).

Wagner, Sigurd et al., "Novel Processing Technology for Macroelectronics," Technology and Applications of Amorphous Silicon, Springer-Verlag publisher, pp. 222-251 (2000).

Wagner, Sigurd et al., "Silicon Thin-film Transistors on Flexible Foil Substrates," IMID '02 Digest, pp. 263-267 (2002).

Wagner, Sigurd et al., "Thin-film transistors and flexible electronics," Research Signpost, pp. 1-14 (2002).

Wagner, Sigurd et al., "Silicon for thin-film Transistors," 2$^{nd}$ International Conference on Cat-CVD (Hot-Wire CVD) Process, pp. 1-6 (2002).

Chiang, A., et al., "A Stylus Writable Electrophoretic Display Device", SID 79 Digest (1979), 4.

Chiang, A., et al., "A High Speed Electrophoretic Matrix Display", SID 80 Digest (1980), 114.

Comiskey, B., et al., "Electrophoretic Ink: A Printable Display Material", SID 97 Digest (1997), p. 75.

Jacobson, J., et al., "The last book", IBM Systems J., 36, 457 (1997).

Burch, B., "Motorola Envoy Personal Wireless Communicator", Business Wire, Motorola, Inc., Mar. 9, 1994, 5.

Want, R. et al., "An Overview of the ParcTab Ubiquitous Computing Experiment", IEEE, Dec. 1995, p. 28-43.

Nicholas Negroponte, "Surface and Displays", Wired issue no. 3.01, Jan. 1, 1997 3 pages.

Search Report for PCT/US99/20777 completed Dec. 17, 1999.

Search Report for EP 03011665 completed Jul. 3, 2003.

Search Report for EP 08 00 9702 completed Aug. 13, 2008.

Search Report for EP 02717399 completed Aug. 27, 2008.

* cited by examiner

ELECTRONIC-INK BASED RFID TAG FOR ATTACHMENT TO A CONSUMER ITEM AND DISPLAYING GRAPHICAL INDICIA INDICATING WHETHER OR NOT SAID CONSUMER ITEMS HAS BEEN READ AND ITS INTEGRATED RFID MODULE HAS BEEN ACTIVATED OR DEACTIVATED

RELATED APPLICATIONS

This application is a continuation of U.S. application Ser. No. 10/934,866 filed Sep. 3, 2004 now abandoned; which claims priority to provisional patent application Ser. No. 60/499,334, filed Sep. 3, 2003; each said application being wholly owned by Metrologic Instruments, Inc. and incorporated herein by reference.

BACKGROUND OF THE INVENTION

The present invention is directed to electronic labels and display devices. More particularly, the present invention is directed to the tracking of changes in state, changes in location or changes in information related to an item associated with an electronic label.

The use of Radio Frequency Identification (RFID) tags are quickly gaining popularity for use in the monitoring and tracking of an item. RPID technology allows a user to remotely store and retrieve data in connection with an item utilizing a small, unobtrusive tag. As a RFID tag operates in the radio frequency (RF) portion of the electromagnetic spectrum, an electromagnetic or electrostatic coupling can occur between a RPID tag affixed to an item and a RFID tag reader. This coupling is advantageous, as it precludes the need for a direct contact or line of sight connection between the tag and the reader. A RPID tag may additionally incorporate an Electronic Product Code (EPC) number that serves to identify a specific item with a unique code. Additionally, a RFID tag may also include various storage means which allow for the storage of information related to the item to which the tag is affixed. Furthermore, data relating to an item can be stored in one or more databases linked to the RPID tag. These databases do not reside on the tag, but rather are linked to the tag through a unique identifier (5) or reference key (s).

Utilizing a RPID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag. While such an arrangement is beneficial, several notable drawbacks exist.

First, following a communication with a tag, a user has no readily available indication if the communication was successful. In an assembly line setting, for example, it is difficult to determine if each item passing a tag reader is read successfully. Furthermore, should one become aware that at least one item was not read, it is time consuming and difficult to pinpoint which item failed to be read successfully. To ensure inventory accuracy in such a situation it may become necessary to reprocess a large number of items a second time in order to account for the missing item. Additionally, when scanning a number of tagged items that are all in close proximity to each other, it is oftentimes burdensome to determine which item tag a user is actually reading.

RPID tags may be employed in both manual and automatic scanning environments. An example of an automatic scanning environment is a conveyor belt with numerous tagged items passing a tag reader. A manual scanning environment, in contrast, is exhibited by a user utilizing a handheld tag reader to query individual packages within a warehouse. When employed in a manual scanning environment, existing RFID techniques require the user to look at a display external to the tag to view information. The display can be an integral part of a handheld manual reader or may be indirectly connected to the reader using various means such as a corded connection or wireless link. The reader may also take the form of a standalone computer system that displays RPID tag information on a computer monitor. Utilizing such an arrangement, a user is burdened by having to look at a computer screen or paper printout in order to try and understand what is transpiring electronically. In light of this, a user's attention is diverted away from the item. Such a diversion is clearly inefficient and may be potentially dangerous.

Additionally, as RFID technology has been implemented on a large global scale, active and passive RFID tags are being embedded within a high percentage of consumer and commercial items. These tags may be active or passive in nature and may communicate on various wavelengths within the electromagnetic spectrum. Active RPID tags are powered by an internal battery and typically support read from the tag, writing to the tag or a combination of both. Passive RPID tags operate without a separate external power source and generate operating power upon communication with the reader. In comparison to active tags, passive tags are much lighter, less expensive, and offer a virtually unlimited operational lifetime. Passive RFID tags typically only support reading information from the tag.

Both active and passive RFID tag may operate within various regions of the radio frequency spectrum. Low-frequency (30 KHz to 500 KHz) tags have low system costs and are limited to short reading ranges. Low frequency tags are commonly used in security access and animal identification applications. High-frequency (850 MHz to 950 MHz and 2.4 GHz to 2.5 GHz) tags offer increased read ranges and high reading speeds. One common application of high frequency tags is automated toll collection on highways and interstates.

The long life and continuous operation of RFID tags, coupled with the distances at which a tag may be read, has caused considerable controversy regarding privacy concerns. A purchaser of a tagged item may pay for a product, leave the store, yet the embedded tag remains activate. An active tag can then be continually read from a distance without the knowledge or consent of the purchaser. Additionally, if the tagged item was purchased using a credit card or debit card, it is 15 possible to associate the unique ill of the tag to the identity of the purchaser. An association such as this essentially allows tracking of individuals based upon tagged items that they have purchased.

SUMMARY OF THE INVENTION

The present invention provides for an electronic label associated with a transponder. The electronic label displays at least one graphical element to provide a visual indication representative of information associated with the transponder. Information associated with the transponder represent able by the graphical element can include a result of a communication with the transponder, a location of the transponder, a location of an item associated with the transponder, a state of the transponder, a state of an item associated with the transponder, a status of the transponder, a status of an item associated with the transponder, or any combination of information. For example, the display of the visual graphical element can indicate a read operation occurred between the transponder and electronic label. Likewise, the display of the visual graphical element can indicate read operation has failed or has not yet taken place between the transponder and electronic label. The graphical element is alterable and updateable, such that a varying status of the transducer, transponder, or an item associated with the transducer, transponder, or electronic label can be communicated to a user in a visual graphical manner. As such, the graphical element displayed by the associated electronic label can indicate if the RFID tag is activate or has been deactivated. Hence, in light of the inherent privacy concerns with the use of RFID tags with consumer items, the present invention provides a method and a system that allows a consumer to readily determine the state of an RPID tag associated with a consumer item through the use of a visual indicator.

The present invention further provides for an electronic label that displays a graphical indication to a user that serves to indicate a location, a state, a status, or any combination thereof of an item associated with the electronic label. This graphical indication is alterable and updateable, such that a varying status of the label can be communicated to a user in a graphical manner. Furthermore, this graphical indicator can be used to represent the status of the item associated with the electronic label.

In one illustrative embodiment of the present invention a method for visually tracking an item is disclosed. Performance of the method provides for the location of an item to be represented by visual indicators on the electronic display of the electronic label associated with the item. The display of this visual indicator is in response to the location, or change of location of the item. Performance of the method can further monitor the item at a plurality of locations to assist in detecting the item as it arrives, departs, or moves around within a location. Further, a plurality of locations may be monitored such that the location of an item may be determined.

The method can further include a step of providing an electronic display, associated with the item that is flexible in nature and capable of moving in a plurality of directions. In one aspect of the present invention, the electronic display may be capable of conforming to the surface topology of an item on which the electronic label is placed.

The method can further include the steps for providing an electronic display with a plurality of regions wherein a plurality of visual indicators may be displayed to indicate a plurality of changes in state or the current state of the item. these indicators can provide an indication in human readable form, a graphical form, a machine readable form or any combination thereof. Human readable forms can include alphanumeric characters, and graphical forms may include shapes, icons or changes in color. Machine readable forms can include barcodes or matrix code symbologies. Matrix code symbologies are not comprised of stacked rows, common to a traditional barcode, but of a matrix array made up of hexagonal, square, polygonal and/or other geometric shapes, lines, or dots. Such symbols are described in, for example, U.S. Pat. Nos. 5,2276,315 and 4,794,239 which are incorporated herein by reference. Such matrix code symbologies may include Veri code, Datacode, and Maxicode. Such matrix array symbologies are currently utilized by numerous parcel delivery services, including the United Parcel Service (UPS).

In one embodiment of the present invention, the electronic display may be constructed of at least a display medium and a backplane. The method can further include steps to display a visual indicator that remains illuminated for a period of time following the removal of power to the display medium. This time period may be a function of the material properties selected for the display medium, a function of the environment in which the display is operating, or may be a controlled by hardware, firmware, software or any combination thereof. In one aspect of the present invention, the electronic display can be sized to cover the entire surface occupied by the electronic label. In another aspect of the present invention, the electronic display can be sized to occupy only a portion of the electronic label.

In another illustrative embodiment of the present invention, a method for indicating the state of an item is disclosed. The current state or a change in state of the item is first detected or determined, wherein this change in state can be detected by monitoring the state of the item. For example, the state or change in state can be detected or determined by monitoring the state of the item using a sensor associated with the electronic label to detect a change in state of the item or the environment in which it is located. After the current state, or a change in state is detected, a visual indicator is displayed on the electronic label associated with the item, wherein the visual indicator indicates the current state or a change in state. In another aspect of the present invention, the state can be defined as read or unread or activated or deactivated. The state of the item can further be defined as having successfully or unsuccessfully received or transmitted information relating to an external database over a wireless link. Furthermore, the method of the present invention can include the step of providing a plurality of visual indicators on an electronic display such that a plurality of state changes can be graphically displayed individually or in a near simultaneous manner. The display of visual indicators can be in a machine readable format or can be in a human readable format. The method can further include the step of powering the electronic display with either an internal or external power source. The method can further include the step of powering the electronic display with a signal having a data component and a power component. Examples of mechanisms for powering an electronic label or RPID tag using a signal having both a power and data component are set forth in U.S. Pat. No. 5,583,819 and U.S. Pat. No. 5,945,920, the contents of which are herein incorporated by reference.

Moreover, upon removal of power to the entire electronic label, or a selected component of the electronic label, the display may continue to provide a visual indicator for a period of time. This time period may be a function of the material properties of those materials used in the electronic display or may be controlled by the electronic label. In one illustrate embodiment of the present invention, the electronic display may further be sized to occupy the entire region occupied by the electronic label. The electronic display can also be sized to occupy only a region of the electronic label. The electronic label, and the electronic display associated with the electronic label can further flex, thereby allowing for movement in a plurality of dimensions.

In another embodiment of the present invention, a system for electronically displaying state information of a tracked item is disclosed. This system includes an electronic label capable of displaying a visual indication of the state of a tracked item. The electronic label includes both a display medium and a mechanism for transferring state information of the tracked item to the label. The system further includes a transceiver module in communication with the electronic label. The transceiver module is capable of transmitting state information to the electronic label, using a communication protocol, either wired or wireless, to remotely update and permanently or temporarily alter the information displayed in human readable for, machine readable form, or both. This transmission can occur at a frequency within the electromagnetic spectrum, including but not limited to radio waves, light waves or microwaves.

The electronic label of the present invention can be flexible and capable of being formed in various shapes and sizes. The number of layers forming the device can vary depending upon the particular components employed in the device, and upon the requirements of the intended application. The electronic display associated with the electronic label can include a plurality of regions. Each region can be graphically display one or more visual indicators. The electronic display is capable of reproducing text and graphical images using segments, pixels or any combination thereof. The displayed visual indicator can be in a machine readable format, a human readable format, or a combination of both. The visual indicator can be reproduced in black and white, grayscale, color, or any combination thereof. Also the label can be used to present any vision based symbologies such as two dimension bar codes, three dimension coding schemes or any combination of graphical, alpha numeric, character, pixel or vision symbologies. Visual indicators presented on the electronic display may be turned on or off, or may be continuously updated and changed. For example, an initial bar code displayed on a pixel addressable display may be replaced with a second barcode to signify the change in status, state or location of an item.

It is a further object of the present invention to provide an electronic label wherein the electronic display continues to display information for a period of time after power is removed. The length of time that the label will continue to display information can be accurately controlled either by varying the attributes of the electronic display or through control hardware, software, or a combination of hardware and software. Furthermore, the time the image remains after power is removed can be a function of time or can be a function of varying parameters, such as the external environment in which the label is operating. Power for the label can be provided form either an internal means or an external means, including an on board battery source, a photovoltaic panel, an inductive or capacitance coupling or any combination thereof. For example, power supplied to the electronic label from an internal battery may be supplemented by power supplied to the electronic label by an external inductive coupling.

According to one practice, the electronic label can be updated utilizing wireless technology. For example radio waves, infrared waves, visible light, microwaves, or any combination thereof can be used. Furthermore, the electronic label can be incorporated into a mixed media label, wherein the electronic label is combined with traditional labels made of pulp or plastic material, onto which information is printed, using such mediums as color print advertisements or black and 25 white barcodes to form a single label arrangement. This multimedia label can then be affixed to an item utilizing traditional means such as, but not limited to, adhesive backings, hook and loop fasteners, or mechanical hardware. In such an embodiment, the electronic label can be sized to cover the entire mixed media label, or can alternatively be sized to only cover a portion of the mixed media label. Furthermore, in one aspect, the electronic display associated with the electronic label can be a bistable non-volatile display. In an alternate aspect the electronic label can be volatile, thereby requiring an on board power source to maintain the visual indicator. In another aspect, the electronic label can be associated with an external sensor capable of providing state information of the item to be tracked.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DETAILED DESCRIPTION

The illustrative embodiment of the present invention provides a method and system for displaying a visual indicator on an electronic display associated with an item to indicate a state, a status or a location of the item. The method and system of the illustrative embodiment of the present invention allows a user to visually confirm the state, status and location of an item with which the electronic label is associated. Likewise, the visual indicator provided by the electronic label associated with the item allows a user to visually ascertain that a change has occurred with the item associated with the electronic display. The electronic display of the present invention may indicate the occurrence of a single location change, state change or a status change, or may indicate the occurrence of a number of state changes, location changes, or status changes of an item associated with the electronic display.

Figure 1:
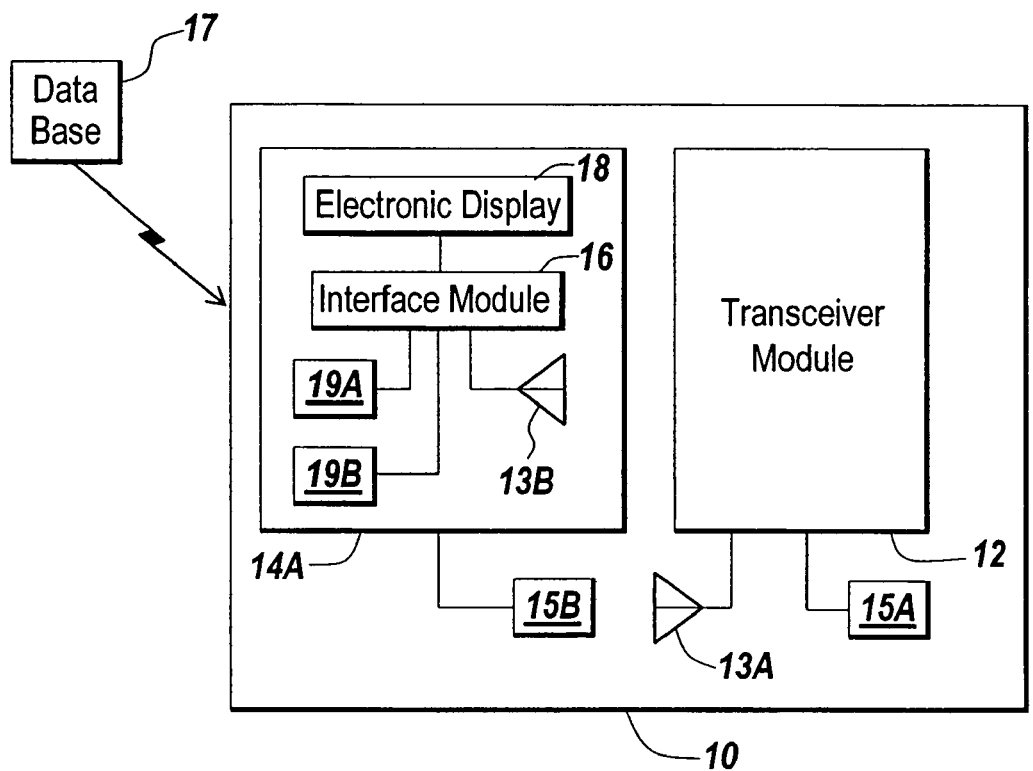
FIG. 1 is an illustrative exploded view of the system for tracking the location of an item according to the teachings of the present invention.

FIG. 1 illustrates a system 10 for electronically displaying information of a tracked item using a transceiver module 12 and an electronic label 14A. The electronic label 14A can include an interface mechanism 16 for translating information received from the transceiver module 12 into a visual indicator that can be displayed on an electronic display 18. The interface module 16 can be further configured to transmit commands, instructions, software programs, and parameters or variables associated with the electronic label, or instructions for use by the electronic label 14A at a later time, as well as instructions for other functions associated with the operation of the electronic label 14A.

The transceiver module 12 can receive and transmit information concerning the item using a communication protocol. The term "communication protocol" as used herein refers to a format for transmitting data between two devices. The format defines any means by which a signal can be transmitted and can include wired means, wireless means or a combination of both. Wired means can include the use of electrical conductors or fiber optic conductors. Wireless signal transmission can occur using any region of the electromagnetic spectrum. For example the visible light, infrared, microwave, radio frequency, X-ray or gamma ray region of the electromagnetic spectrum can be utilized. An antenna 13A can be coupled to the transceiver module 12 for transmitting and receiving wireless signals. A power supply 15A for providing power to the transceiver module 12 can also be coupled with the transceiver module 12. The power supply 15A can be either internal to the transceiver module 12, or can be eternal to the transceiver module 12. For the purpose of illustration, the power supply 15A has been shown as external to the transceiver module 12.

The electronic label 14A can further contain an antenna 13B coupled with the interface module 16. This antenna 13B can be used to send, receive, or send and receive a wireless signal containing information of the item associated with the electronic label 14A. Those of ordinary skill will recognize that any number of suitable antennas can be employed in connection with the electronic label of the present invention. For example, the electronic label 14A can employ a common antenna perform all necessary functions, a discrete antenna for each function associated with the electronic label, or any subset of antennas for performing one or more functions. The wireless signal received by the antenna associated with the interface module 16 can contain a data signal, a power signal or a combination of both. A power signal can be used to provide power to the electronic label 14A. Absent a power signal, a power supply 15B can be coupled with electronic label 14A. This power supply 15B can be located internal to the electronic label or external to the electronic label. Additionally, the electronic label 14A can utilize more than one power supply means, wherein a second power supply 15B can be utilized in augmenting a primary power supply. For example, an electronic label 14A that receives power through a wireless power signal can further utilize an external power supply 15B to augment power provided to the label 14A.

The electronic label 14A further includes a Radio Frequency Identification (RPID) tag 19A. The REID tag 19A can allow for the remote storage and retrieval of data in connection with the item associated with the label. The electronic label 14A can also be associated with an Electronic Product Code (EPC) module 19B. The EPC module 19B can provide a unique identifier associated with each tracked item in conjunction with the RPID tag 19A.

Furthermore, data relating to an item can be stored in one or more databases 17 linked to the RFID tag. These databases can reside on the electronic label 14, or can be linked to the electronic label 14 through a communication protocol such as an encrypted wireless link. For the purpose of clarity, the database 17 is shown remotely located from the electronic label 14A.

Figure 2:
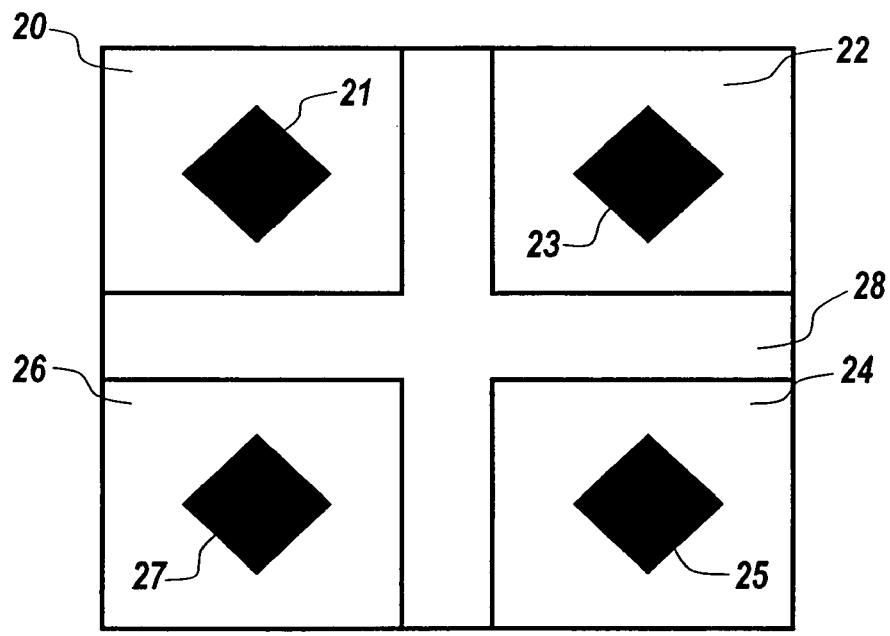
FIG. 2 is another illustrative view of the electronic display associated with the electronic label according to the teachings of the present invention.

FIG. 2 illustrates the electronic display 18 associated with an electronic label 14A. The electronic display 18 can be configured to include a number of regions 20, 22, 24, 26 for displaying one or more visual indicators 21, 23, 25 and 27. The electronic display 18 can display one or more graphical or textual representations, simultaneously or sequentially, in each of the regions 20, 22, 24 and 26 for use in tracking an item in a supply chain environment. A region is defined as a portion of the electronic label 14B and can be made of a single pixel, a plurality of pixels, a segment or a combination thereof. A region can be of any size, shape or location can be defined on the electronic display 18 of the electronic label 14A. In one aspect, the electronic display 18 associated with an electronic label 14B has been divided into four distinct regions 20,22,24,26, each of which is separated by a null region 28. The null region 28 can be made of a material distinct from the material that the electronic display 18 is manufactured, can be a defined region on the electronic display 18 on which no graphical indication is displayed, or can be a combination of both. Each region can display one or more visual indicators 21, 23, 25 and 27 in various forms. For example, a visual indicator can be a simple color change, the placement of a symbol such as a circle or triangle, or can include a number of textual or graphical representations. In a supply chain tracking setting, prior to entering the designated supply chain the electronic label 14B has no visual indicators illuminated. After passing through a first step in the supply chain, a first visual indicator 21, on a first display region 20 is displayed. As the tracked item passes through additional stages in the supply chain, additional visual indicators 23, 25, 27 on various regions 22, 24, 26 are displayed corresponding to each state that the tracked item has completed within the supply chain. The non-electronic region 28 located between the various regions 20, 22, 24, 26 allows for the display of non-electronic information such as plain text, graphics, or simply a uniform color. In one embodiment, the non-electronic region 28 may have the various locations of the supply chain through which the item will pass printed in plain text. The non-electronic region 28 may be further utilized for any purpose relating to the implementation of the electronic label or may optionally be deleted.

Figure 3A:
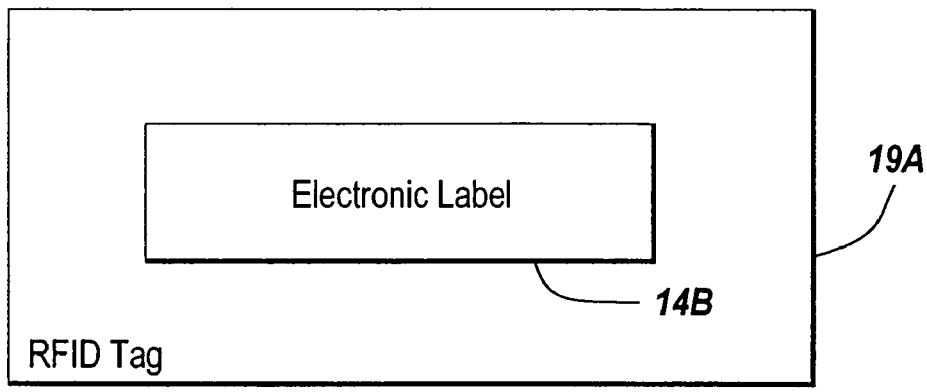
FIG. 3A is an illustrative view of an electronic label and an RPID tag according to the teachings of the present invention.
Figure 3B:
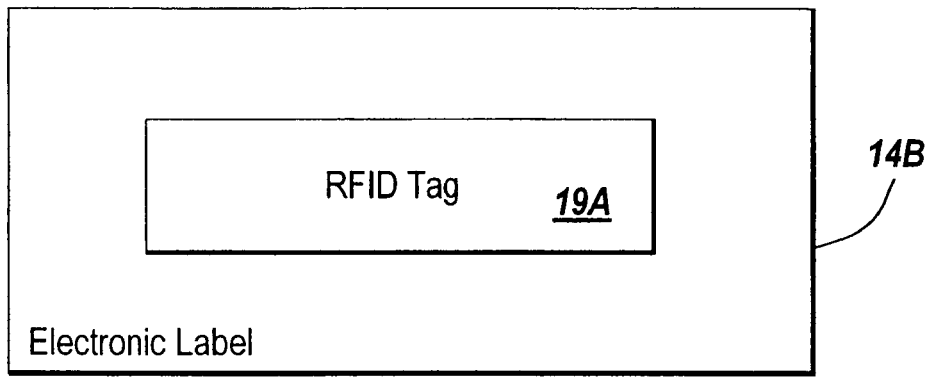
FIG. 3B is an illustrative view of an electronic label and an RPID tag according to the teachings of the present invention.
Figure 4:
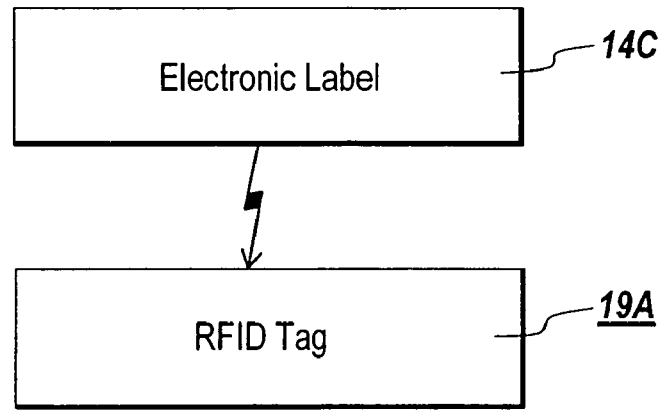
FIG. 4 is another illustrative view of an electronic label and an RPID tag according to the teachings of the present invention.

FIGS. 3A and 3B illustrate the electronic label 14B when used in conjunction with an RFID tag 19A. In FIGS. 3A and 3B, the electronic label 14B and the RPID tag 19A are physically and electronically combined into a single entity. As illustrated, the electronic label 14B can occupy a portion of the RFID tag 19A or alternatively the RPID tag 19A can occupy a portion of the electronic label 14B to form an integrated device. Further, as illustrated in FIG. 4, the electronic label and the RPID tag are physically separate, but in communication with each other. The RFID tag 19A and electronic label 14B can be sized and shaped according to the desired function of the electronic label. For example, the electronic label 14B can be sized for use with shipping containers, pallets, consumer goods, luggage, employee badges, and access control passes.

FIG. 4 illustrates the electronic label 14C when used in conjunction with a RPID tag 19A. The electronic label 14C and the RPID tag 19A are physically and electronically separate from each other. The electronic label 14C and the RFID tag 19A can communicate via a communication protocol. One example of this communication protocol is a wireless link.

Figure 5:
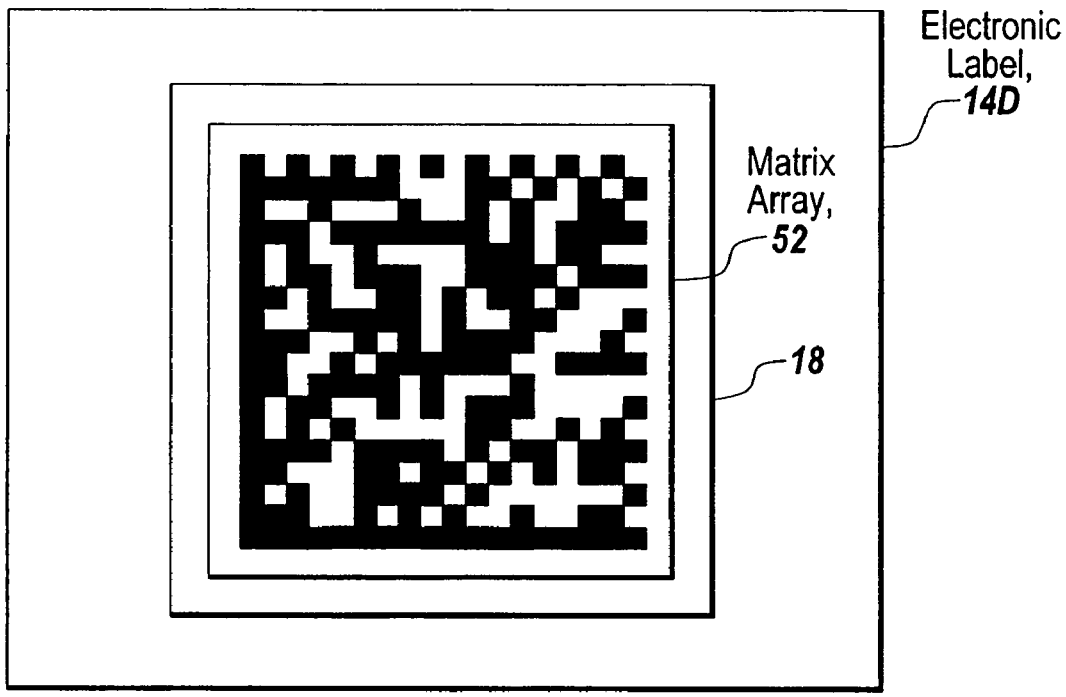
FIG. 5 is another illustrative view of an electronic label and electronic display associated with the electronic label according to the teachings of the present invention.
Figure 6:
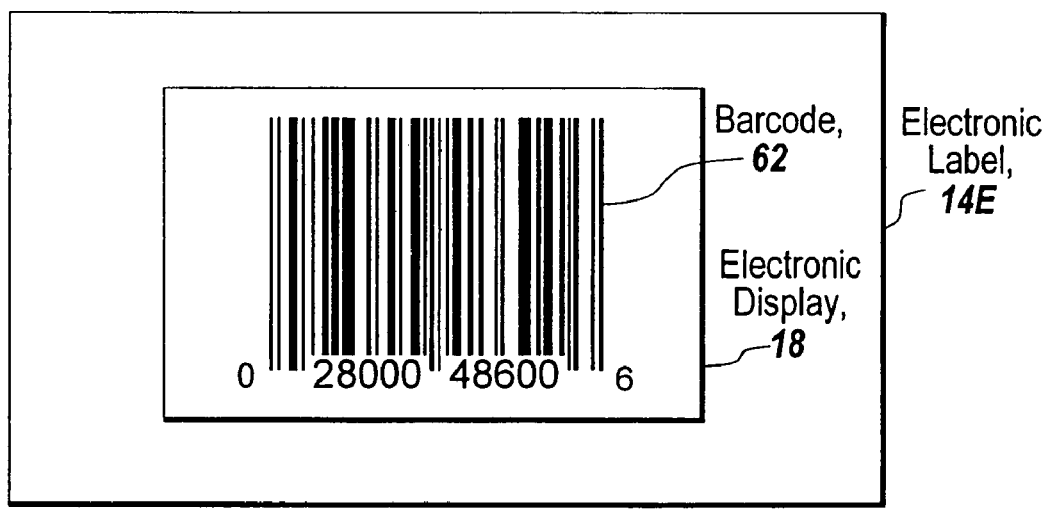
FIG. 6 is another illustrative view of an electronic label and electronic display associated with the electronic label according to the teachings of the present invention.

FIG. 5 and FIG. 6 show to illustrative examples of machine readable data 52, 62 which can be displayed on an electronic display 18 associated with an electronic label 14D, 14E. As exhibited in FIG. 5, a visual indicator can be presented on an electronic display 18 associated with an electronic label 14D in a machine readable format wherein the visual indicator is a matrix array symbology 52. The matrix array can be made up of hexagonal, square, polygonal and/or other geometric shapes, lines, or dots. As further evidenced in FIG. 6, a visual indicator can be presented on an electronic display 18 associated with an electronic label 14E in a machine readable format such as a barcode 62.

Figure 7:
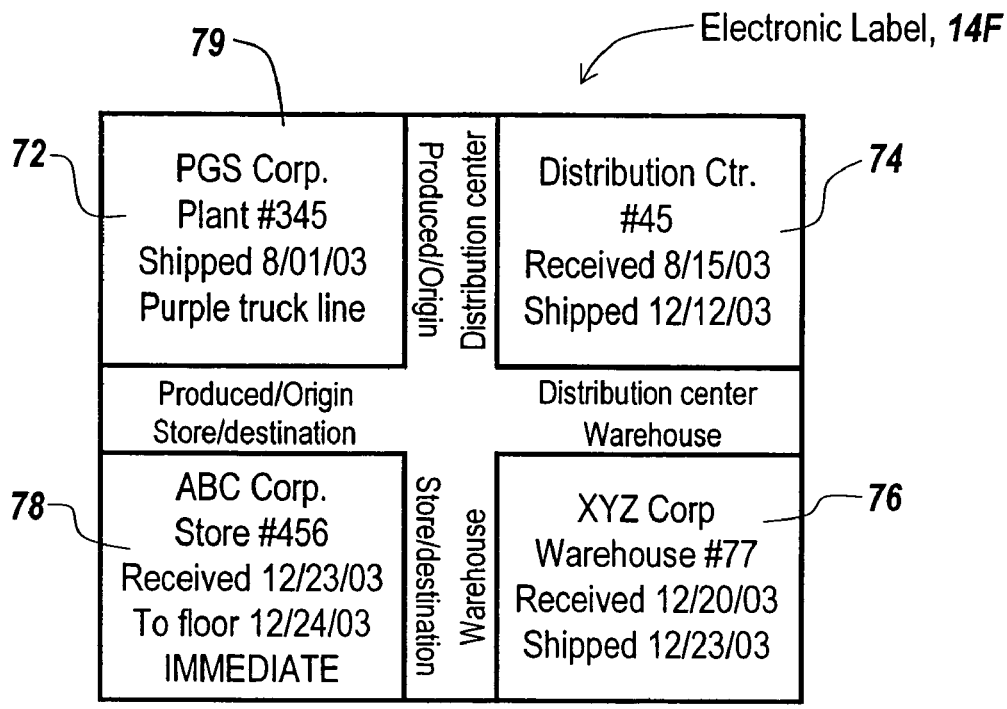
FIG. 7 is another illustrative view of an electronic label and electronic display associated with the electronic label according to the teachings of the present invention.

FIG. 7 illustrates an electronic label 14F in accordance with the teachings of the present invention. The electronic label 14F includes four regions 72, 74, 76, 78 each region is capable of displaying a visual indicator simultaneously or sequentially. A region is a defined portion of the electronic display and can be made of a single pixel, a plurality of pixels, a segment, a plurality of segments or any combination thereof. A region can be of any size, shape of location on the electronic display of the electronic label. The electronic display 18 can have any number of regions of various sizes and shapes. The visual indicator displayed on each of these regions can provide detailed information relating to the tracking of state, status, location or other information relating to an item. For example, the name of the manufacturer, the plant at which the product was produced, as well as the shipping date and company can be displayed in a region 72. After passing from the manufacturer to a distribution center, a new data set including the date received and the date shipped can again be displayed on a different region 74.

For the purpose of illustration, visual indicators displayed in the various regions are provided in plain text, but in practice the electronic label 14F can provide data on an electronic display in any number of formats including but not limited to machine readable barcodes and symbols, geometric shapes, or varying colors. For example, the visual indicator displayed on the electronic display 18 associated with the electronic label 14F may be a machine readable barcode or a matrix array symbology. Utilizing a barcode or matrix array symbology, detailed information can be presented in a machine readable format. The information can relate to past, present or future locations within the supply chain. In the alternative, the visual indicator may include both a human readable display as well as a machine readable display.

The visual indicator on the electronic display 18 can be used to display at least one of a past location, a present location or a future location of the item to be tracked. A future location of an item can be a new location or can be a return to a previous location. For example, an item can move from a shelf in a warehouse to an inventory control point within the same warehouse. This can be viewed as a move from a past to a present location. The item can then move from the present location, the inventory control point, to either a truck for delivery or can be return to the shelf in the warehouse. The move from the inventory control point to either the awaiting truck, or the shelf in the warehouse is a move from a present location to a future location. The present invention also provides a visual indication of current location of the electronic label attached to an item without the need for any knowledge of past or future locations relating to the item In one embodiment, information indicated on the various regions of the electronic display 18 associated with the electronic label 14F may remain for a fixed period of time upon the removal of power from the electronic display 18. This time period may be a function of the material properties of the electronic display 18, a function of the operating environment of the electronic display, or may be controlled by the interface module of the electronic label. Operating environment factors include, but are not limited to, temperature, humidity, pH, sunlight, ultraviolet light, as well as the presence of various chemical compounds, radioactivity, pathogens, bacteria, viruses or pryons.

Figure 8:
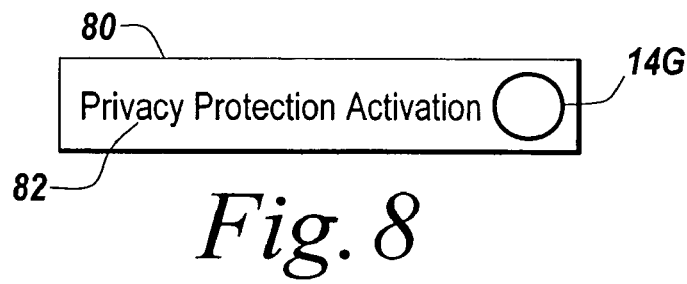
FIG. 8 is another illustrative view of an electronic label according to the teachings of the present invention.

FIG. 8 illustrates the electronic label 14G in accordance with the teachings of the present invention when used as an indicator of a state of the electronic label 14G. In one embodiment, the electronic label 14G can be part of a larger label 80 wherein two or more display mediums are combined. A first medium can be a traditional print advertisement 82, and the second medium can be an electronic label 14G as taught in the present invention. In the embodiment shown, the electronic label 14G is used to serve as an indicator of state of an attached RFID tag (not shown). Those skilled in the art will appreciate that the RFID tag is integrated into the electronic label 14G, or in the alternative is not integrated in the electronic label 14G but is in communication with the electronic label 14G. The presence of a visual indicator on the electronic display 14G can indicate that the RPID tag (not shown) associated with the electronic label 14G is activated. An extinguished visual indicator on the electronic label 14G can indicate that the RPID tag (not shown) is inactive. In light of the inherent privacy concerns associated with RFID tags that unintentionally remain active after a user purchases an item and leaves a store, providing a visual indication that the RFID tag associated with an item is no longer capable of transmitting serves to alleviate any privacy concerns a consumer may have. The use of the present invention to verify the status of a RFID tag 19 A is presented solely as an example of the potential uses.

The visual indicator may additionally take numerous forms, and is not limited to the circular arrangement presented as an example. In one embodiment, a varying color change may be utilized to indicate a state change. In an alternate embodiment, numerous visual indicators may be associated with the electronic label 14G, wherein human readable or machine readable information is presented on each indicator. Furthermore, the electronic label 14G of the present invention maybe sized such that it alone is the indicator of RFID tag state, or can be a portion of label 80 which combines a first media 82 and second media 14G. The first media 82 can be a non-alterable print advertisement, and the second media can be an electronic label in accordance with the present invention 14G.

Figure 9:
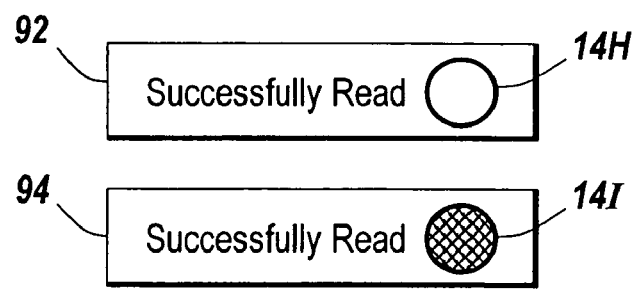
FIG. 9 is another illustrative exploded view of an electronic label according to the teachings of the present invention.

FIG. 9 illustrates an electronic label 14H of the present invention when used as a read indicator. A read indicator in accordance with the present embodiment will change from an initial state to a new state upon a successful read. These state changes may be indicated on an electronic display 18 by the appearance of an icon or color change, or may be indicated by the appearance of a pre-determined message. Additionally, the electronic label 14H may incorporators a plurality of regions wherein a plurality of read indicators is employed on an electronic display, such that the read status of an item at numerous locations can be visually depicted. For the purpose of clarity, a single region is shown in the present embodiment.

In FIG. 9, a read indicator is shown in two alternate states, namely an unread state 92 and a read state 94. In both states, an electronic label 14H display can provide a visual indication following a change in state of item to which the read indicator is attached. As illustrated in the unread 92 state, no graphical indication is displayed on the electronic label 14H prior to a successful read of the tag associated with the electronic label 14H. Following a successful read of the tag associated with the electronic label, the electronic label 14H can provide a visual indicator to a user. This visual indicator proves useful in inventory management and supply chain tracking, as absent a read indicator associated with an electronic display it is difficult to determine if an item with an electronic tag has been successfully scanned and entered into inventory.

Figure 10:
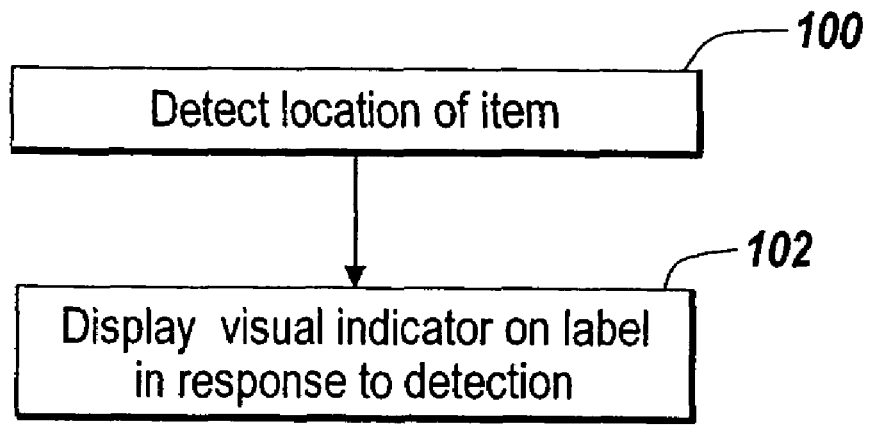
FIG. 10 is a flow diagram which illustrates a method for tracking an item in accordance with the present invention.

FIG. 10 is a flow diagram which illustrates a method of marking an item in accordance with the present invention. In step 100, the item is detected at a location. In step 102, a visual indicator is displayed on the electronic label associated with an item in response to detection of the item at the location. The detection can be calculated based upon information derived from one or more locations. Upon detecting a location of an item a visual indicator is displayed on the electronic display associated with the electronic label. This visual indicator can be a graphical object, a machine readable barcode, a human readable text string, or any combination thereof. Data displayed by the electronic label can be in black and white, contrasting colors, a full color display or a combination thereof. Additionally, the visual indicator can occupy the entire electronic display, or can be displayed in one or more regions of the electronic display. Furthermore, the electronic display can continue to display data for a period of time after power to the display medium is removed. The time period for which the visual indicator continues to display data may be controlled from within the electronic label, may be a function of the material properties used to construct the electronic display, or may be a function of the environment in which the label is operating.

Figure 11:
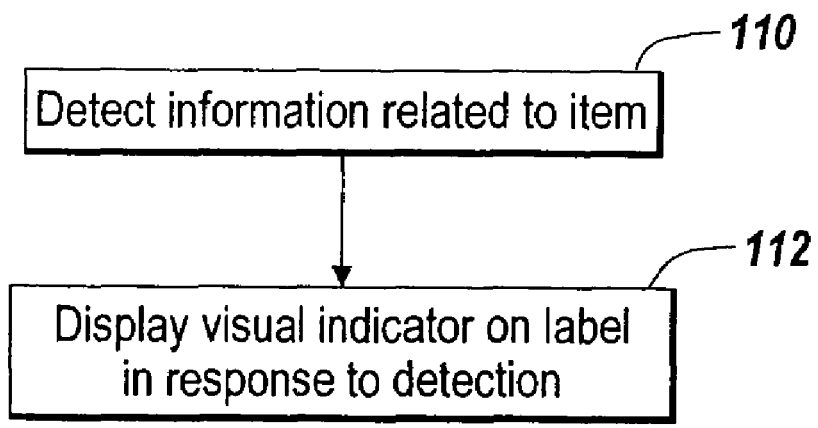
FIG. 11 is a flow diagram which illustrates a method for indicating a state of an item in accordance with the present invention.

FIG. 11 is a flow diagram which illustrates a method for tracking an item in accordance with the present invention. In accordance with step 110, information related to the item is detected. In step 112, a visual indicator is displayed on the electronic label in response to the detected information. The information can be based upon monitored state data, or can be derived from data supplied to the electronic label. For example, state data may include, but is not limited to a read or unread status of the tag associated with an item or activated or deactivated status of a electronic label associated with the item to be tracked. This visual indicator can occupy the entire electronic display, or can be located on one or more regions of the electronic display. The visual indicator can be in black and white, grayscale, color, or some combination thereof. Furthermore, the visual indicator can be in a machine readable format, a human readable format, or some combination of the two. The electronic display can continue to display state data for a fixed period of time after power tone or more portions of the electronic label is removed. The time period for which the electronic display continues to display data may be controlled from within the electronic label, may be a functional of the material properties used to construct the electronic display, maybe a function of the operating environment of the label, or may be some combination thereof.

Figure 12:
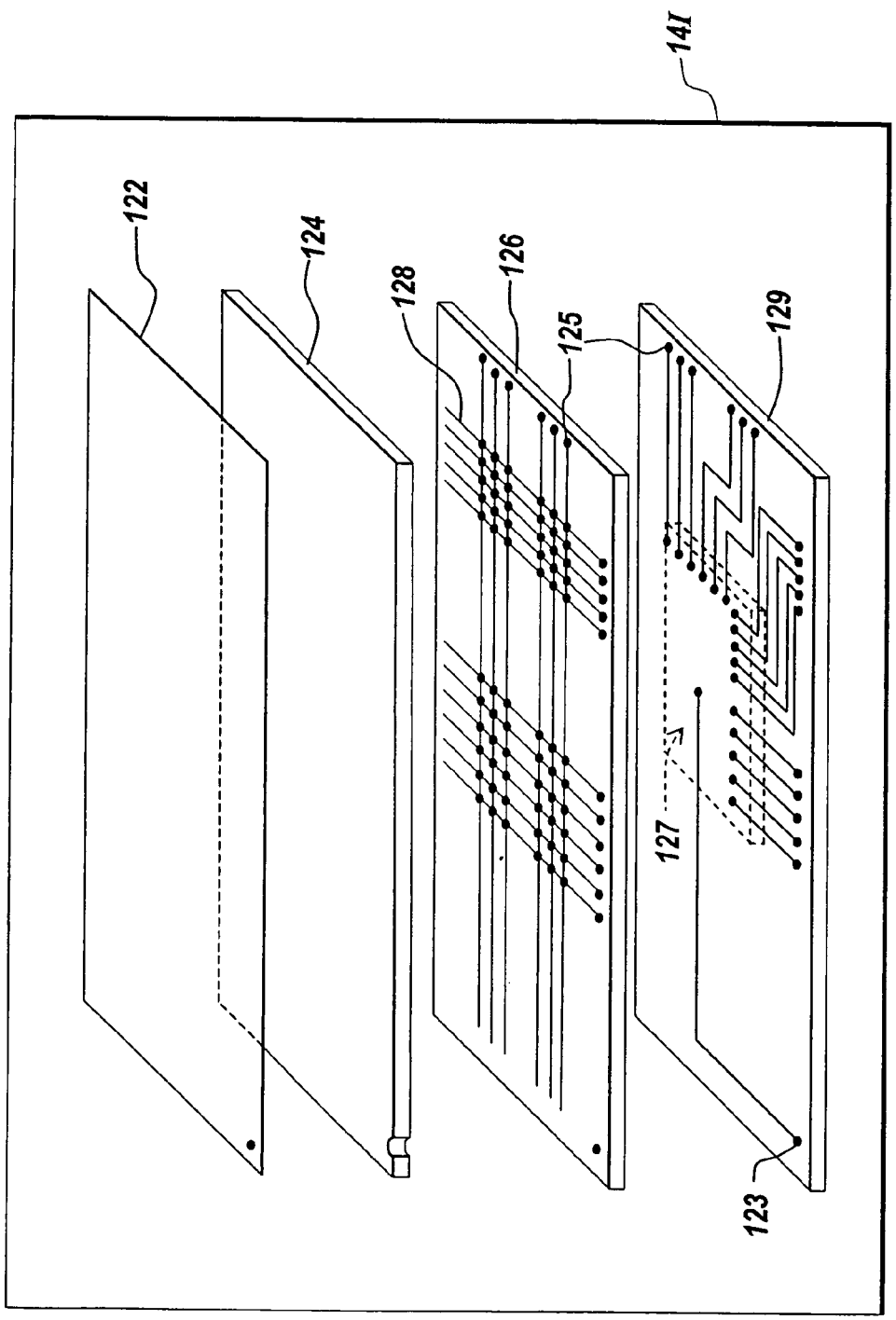
FIG. 12 is another illustrative exploded view of an electronic label according to the teachings of the present invention.

FIG. 12 is an exploded schematic view illustrating the composition of one embodiment an electronic label 14I according to the teachings of the present invention. A transparent reference electrode 122 is disposed over a display medium 124 wherein the reference electrode 122 is utilized in completing the electrical circuit necessary for activation of the display medium 124. A clear protective layer may be disposed over the transparent reference electrode 122 should it be necessary to prevent physical trauma or damage to the electronic label. The display medium 124 can be formed or constructed of multiple layers of material, but for purposes of illustration and clarity it is illustrated as a single layer. In one embodiment, the display medium 124 can be flexible and capable of movement in a plurality of dimensions, whereas in an alternative embodiment the display medium 124 is rigid. The display medium 124 is associated with a backplane 126 such that the backplane 126 is capable of activating a visual indicator on the display medium layer 124. The visual indicator can include a graphical or textual representation, such as an icon, a geometric shape, a barcode or any other like representation. The visual indicator can be in black and white, various shades of grey, or can be in color. Combinations of the aforementioned visual indicators may be provided on a single electronic display. Additionally, the display medium 124 may be partitioned into numerous regions. These regions may be a single pixel, a combination of pixels, a segment, or any combination thereof. A region can be of any shape or size, and any number of regions can exists on the electronic display medium 124. Furthermore, each of these regions can display one or more visual indicators.

The electronic label 14I can be attached to an item utilizing numerous means. For example, conventional mechanical fastening system, loop and hook-type arrangements, stitches, adhesives, as well as other known fixation techniques may be employed to permanently or temporarily attach the electronic label to an item. The electronic label 14I can also be integrally formed with the item, or can be used as a stand alone electronic label. As used herein, the term label is intended to include a label, strip, tag or general display device that is sufficiently sized and configured for attachment to an item. While the electronic display 18 associated with the electronic label 141 is shown as a plurality of layers in FIG. 12, those of ordinary skill will appreciate that the label may be made of a single layer. Examples of electronic labels comprising one or more layers suitable for use with the present invention are set forth in U.S. Pat. No. 6,753,830 B2, the contents of which are herein incorporated by reference. Further examples of electronic labels comprising one or more layers suitable for use with the present invention are set forth in U.S. application Ser. No. 09/393,553, U.S. application Ser. No. 09/760,363, U.S. application Ser. No. 10/300,514, and U.S. Application No. 60/498,983.

Dispersed across the backplane 126 is a plurality of conductive traces 128, wherein these conductive traces 128 are oriented to activating a visual indicator on the display medium 124. The display medium 124 can be actuated utilizing numerous methods depending upon the intended visual indicator. The backplane 126 may employ direct drive icon activation, direct drive alpha numeric segment based character activation, row column addressable indicator activation, active matrix indicator activation, or a combination of the above to adequately display a visual indicator on the display medium 124. The aforementioned illumination means can be employed separately or in combination depending upon the intended visual indicator. For example, some indicators may require a direct line to illuminate the display medium, whereas other indicators such as free text may require an active matrix row column or a pixel addressable arrangement to adequately display the visual indicator.

The display medium 124 can be a bi-stable, non-volatile display medium or can be a volatile display medium. Examples of bi-stable non-volatile mediums include but are not limited to encapsulated and un-encapsulated electrophoretic material, Cholesteric materials, polymer dispersed cholesteric liquid crystals (PDChLC), encapsulated cholesteric materials, separated redox and dye reaction materials such as Dow Commotion® display medium, ph sensitive dyes, electrothermochromics displays and thermo-chromic, zenithal bi-stable, nematic, and surface stabilized ferroelectric liquid crystals.

The display medium 124 can further comprise electronic ink, wherein the electronic ink is capable of displaying a graphical indicator on the electronic label. The term "electronic ink" as used herein is intended to include any suitable bi-stable, non-volatile material. The term "bi-stable" as used herein is intended to indicate that the particles of the imaging material can alternately occupy two stable states. For example, the particles corresponding to different pixel locations of the display assembly can alternately occupy an ON or an OFF state to form selected indicia.

In an illustrative embodiment, the display media is reflective to provide a greater viewing angle to the image displayed by the electronic label. In this case, the particles in the imaging material can be oriented in a first state to reflect light (ON) or a second state to absorb light (OFF). The term "non-volatile" as used herein is intended to denote that the imaging material has indefinite memory without power and will retain an image in the absence of power to the electronic label. The particles in the imaging material maintain a first state unless actively directed to change to a second state. Thus, the imaging surface of the label shows a high-quality image even when power to the label is turned off. The electronic ink can also be a printable, conductive ink having an arrangement of particles or microscopic containers or microcapsules. Each microcapsule has disposed therein an electrophoretic composition of a fluid, such as a dielectric or emulsion fluid, and a suspension of colored or charged particles or colloidal material. The diameter of the microcapsules typically ranges from about 30 to about 300 microns.

According to one practice, the particles visually contrast with the dielectric fluid. According to another example, the electronic ink can include rotatable balls that can rotate to expose a different colored surface area, and which can migrate between a forward viewing position and/or a rear non-viewing position, or both. On example of such a material is a gyri can. Gyricon is a material comprised of twisting rotating elements contained in liquid-filled spherical cavities and embedded in an elastomer medium. The rotating elements can be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. No. 6,147,791, U.S. Pat. No. 4,126,854 and U.S. Pat. No. 6,055,091, the contents of which are herein incorporated by reference.

A reference electrode layer 122 can be used in conjunction with the electronic ink disposed upon a display medium 124 and a backplane 126 to form an electronically activatable and addressable electronic display 18. The electrode and backplane can be disposed on, or cover opposite sides of the microcapsule arrangement, or both to provide structure for creating a potential difference across the electronic ink that causes particles within the microcapsules to migrate toward one of the electrodes. This migration can change the color of the sphere, and hence the pixel location, as viewed by an individual. According to one practice, the microcapsules can be filled with electrically charged white particles in a black or colored dye. Examples of electronic ink and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The term electronic ink can also include a bi-stable non-volatile cholesteric imaging material. The cholesteric liquid crystal material has positive dielectric anisotropy and can include a chiral material in an amount effective to form focal conic and twisted planar textures. Typically cholesteric imaging material comprises liquid crystal cells ranging in thickness from about 25 microns to about 50 microns. Suitable cholesteric materials are disclosed for example in U.S. Pat. No. 6,154,190, U.S. Pat. No. 6,061,107 and U.S. Pat. No. 5,847,798, the contents of which are incorporated herein by reference.

In addition, the electronic ink can include zenithal bi-stable display technology to form the bi-stable nonvolatile display assembly comprised of a bi-stable nematic liquid crystal device cell. The bi-stable nematic cell is provided with a surface alignment grating on at least one cell wall and a surface treatment on an opposite cell wall. The material is activated by dc pulses to form an image. Suitable zenithal bi-stable devices are disclosed in U.S. Pat. No. 6,151,096, world patent application number W009804953A1, world patent application number W009934251AI, U.S. Pat. No. 6,054,973, world patent application number W000052671A1, and U.S. Pat. No. 6,151,096, the contents of which are herein incorporated by reference.

Further, the electronic ink can include a thermo-chromic material. A thermo-chromic material is capable of changing its state alternately between transparent and opaque upon the application of heat. In this manner, a thermo-chromic imaging material develops images through the application of heat at specific pixel locations in order to form an image. The thermo-chromic imaging material retains a particular image until heat is again applied to the material. The display assembly is reusable, rewritable, non-volatile, bi-stable. Visually, black characters are written in a transparent background by applying heat to selected locations or pixels in the display layer. To form color displays other colors, such as red, yellow, and blue are used. Since the rewritable material is transparent, UV fluorescent printings, designs and patterns underneath can be seen through.

The electronic ink can also include surface stabilized ferroelectric liquid crystals (SSFLC). Surface stabilized ferroelectric liquid crystals confining ferroelectric liquid crystal material between closely-spaced glass plates to suppress the natural helix configuration of the crystals. The cells switch rapidly between two optically distinct, stable states simply by alternating the sign of an applied electric field.

Magnetic particles suspended in an emulsion comprises an additional imaging material suitable for use with the present invention. Application of a magnetic force alters pixels formed with the magnetic particles in order to create, update or change human readable indicia, machine readable indicia or both. Those skilled in the art will recognize that a variety of bi-stable non-volatile imaging materials are available and may be implemented in the present invention.

The electronic label can further include an electronics layer 129 which can include an electronics module 127. The electronics module can control the activation of the display medium 124. The electronics module 127 can contain one or more silicon chips, programmable microcontrollers or discrete components used in displaying a visual indicator on the display medium 124. The electronics module can further include one or more sensors. These sensors can monitor the external environment in which the electronic label 14A is operating. For example, in one embodiment an external temperature sensor can be employed so that in the event that the electronic display 18 experiences a period below freezing a visual indicator on the display medium can be displayed to a user. Sensors may further monitor humidity, Ph, sunlight, ultraviolet light, chemicals, radioactivity, pathogens, bacteria, viruses or pryons in the environment surrounding the electronic display 18.

Furthermore, the electronics module 127 can transmit and receive information to and from a location using any suitable communication link, such as a standard electrical cable, optical fiber, wireless network or any suitable direct or indirect connection or link. The applications and embodiments described below generally employ radio signals transmitted and received through an applicable antenna associated with the electronics module 127.

The electronic label 141 can also contain conductive traces 128. The conductive traces can be oriented such that upon assembly of the electronic label 141 electrical continuity between the conductive traces 128 on the backplane layer 126 and the electronic layer 129 can be established by way of embedded electrical contact points 125.

The electronic label 141 can retain a visual indication on the display medium 124 for a period of time after power to the display medium is removed. The time period for which this visual indicator on the display medium remains present may be controlled by the material properties of the display medium 124, can be controlled by the electronic hardware 127 located on the electronic layer 129, or can be a function of the external environment in which the electronic label 141 is operating. The illustrated electronic label 141 may be of varying size and shape as understood by those skilled in the art. For example, the electronic label 141 may be sized to fit on a shipping container or a pallet. Furthermore, the electronic label 141 can be sized to fit on a envelope, or can be sized to cover a portion of a shelf in a supermarket.

Figure 13:
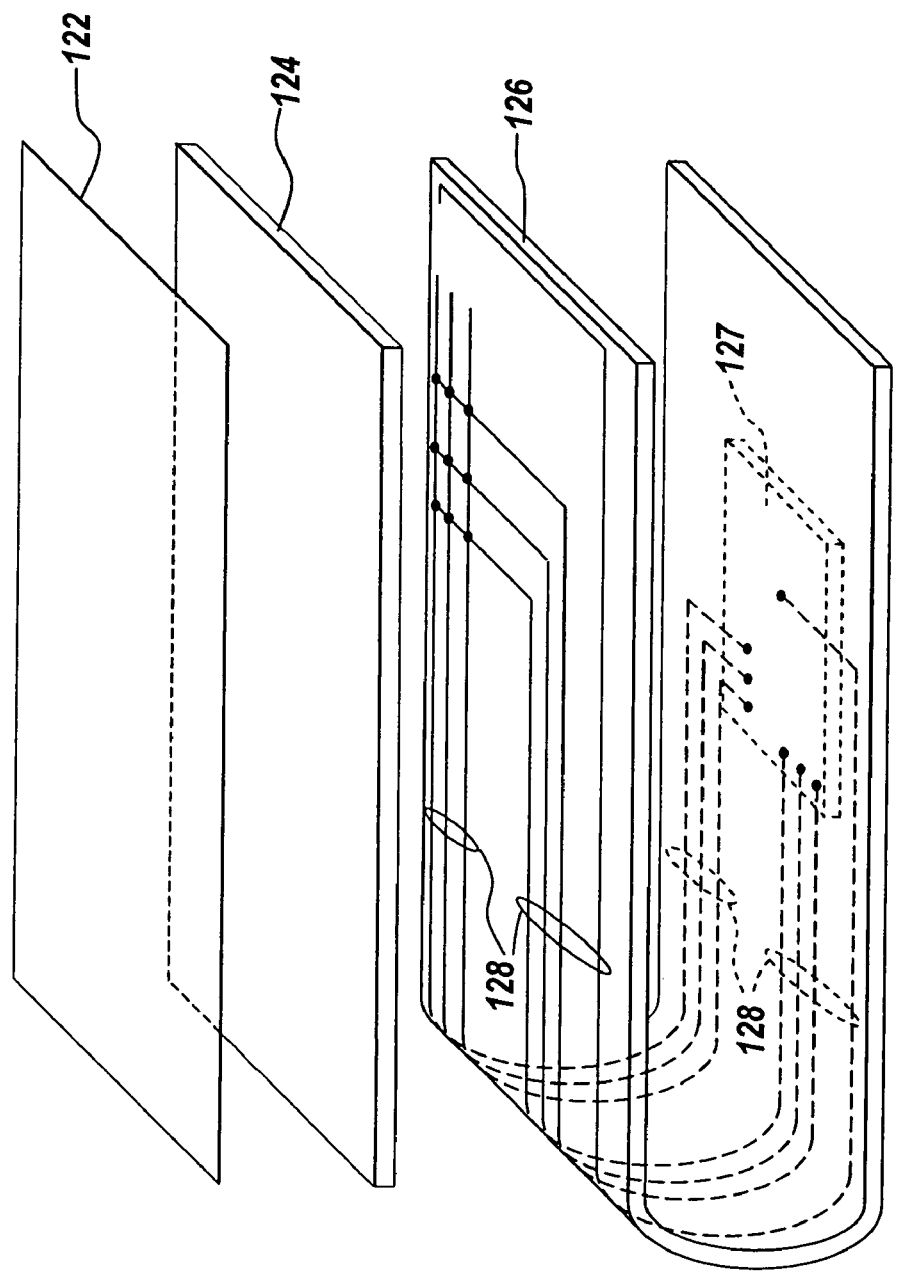
FIG. 13 is another illustrative exploded view of an electronic label according to the teachings of the present invention.
Figure 14:
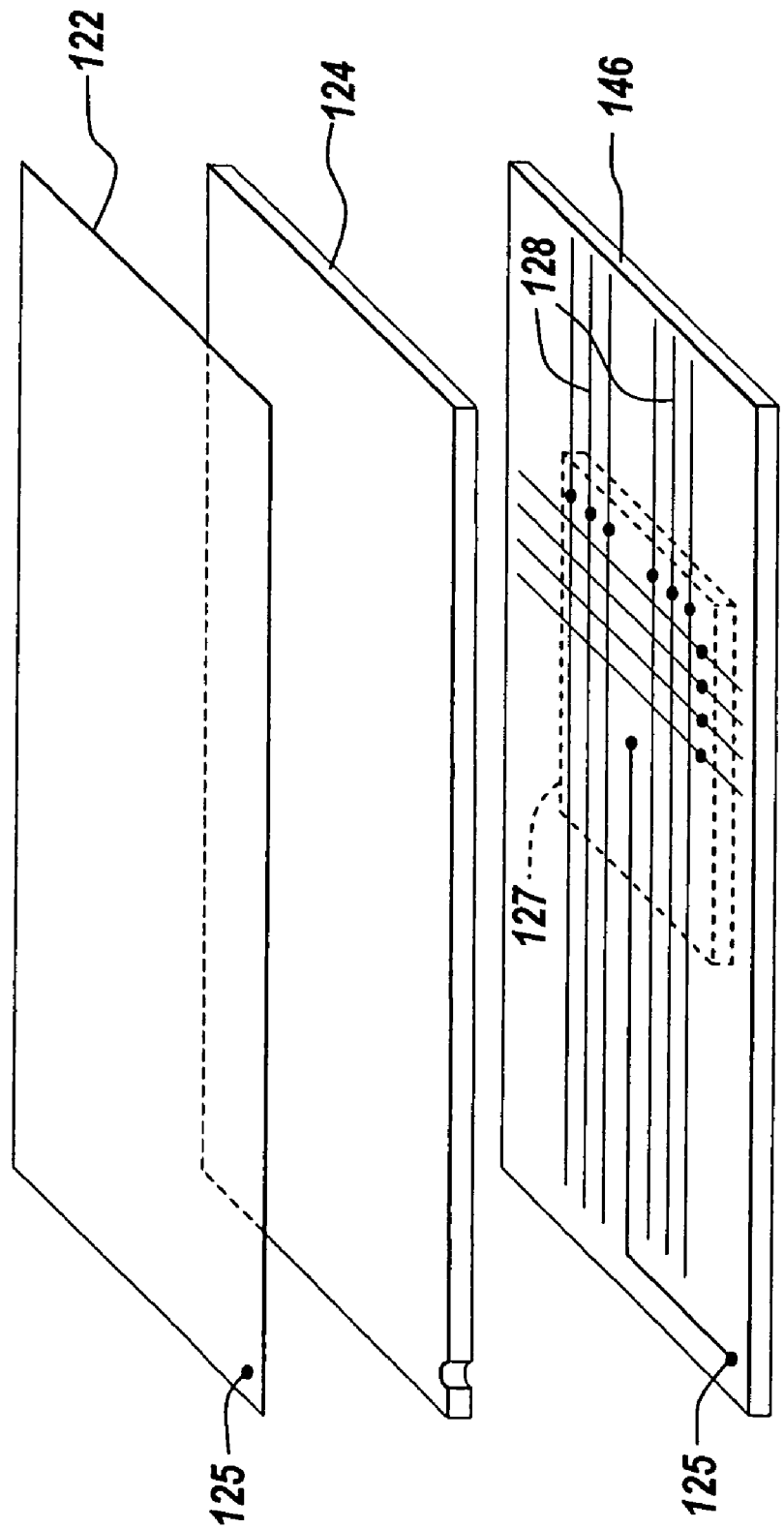
FIG. 14 is another illustrative exploded view of an electronic label according to the teachings of the present invention.

FIGS. 13 and 14 illustrate two additional embodiments of the electronic label 141. As seen in FIGS. 13 and 14, the backplane can be combined with the electronics layer using various means. For example, as seen in FIG. 14, a continuous backplane and electronics layer 136 can be constructed on a single substrate which is then folded to form a compact electronic label 141. Such an arrangement eliminates the need for the electrical contact points 125 between the stacked backplane and electronics layer of FIG. 12. In an alternate embodiment, as seen in FIG. 14, the backplane and electronics layer can be manufactured on a single substrate 146, thereby resulting in reduced size requirements.

Figure 15:
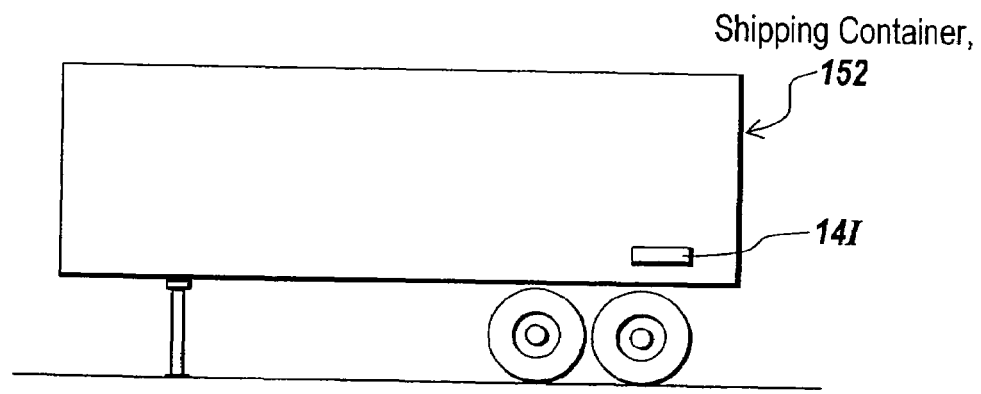
FIG. 15 is another illustrative exploded view of an electronic label according to the teachings of the present invention.

FIG. 15 illustrates and electronic label 141 of the present invention when used in conjunction with a shipping container 152. The shipping container 152 can be located at a loading dock or warehouse and can be mobile in nature. An electronic label 141 can be attached to the shipping container 152 using various permanent or temporary means as understood by those skilled in the art. The electronic label 141 can further display a visual indicator signifying the state, status, location or some combination thereof of the shipping container 152.

Figure 16:
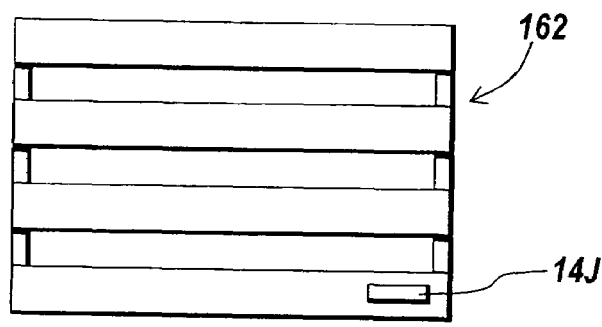
FIG. 16 is another illustrative exploded view of an electronic label according to the teachings of the present invention.

FIG. 16 illustrates and electronic label 14J of the present invention when used in conjunction with a pallet 162. The pallet 162 can be located at a loading dock or warehouse and can be mobile in nature. An electronic label 14J can be attached to the shipping container 162 using various permanent or temporary means as understood by those skilled in the art. The electronic label 14J can further display a visual indicator relating to the state, status, location or some combination thereof of the pallet 162.

Figure 17:
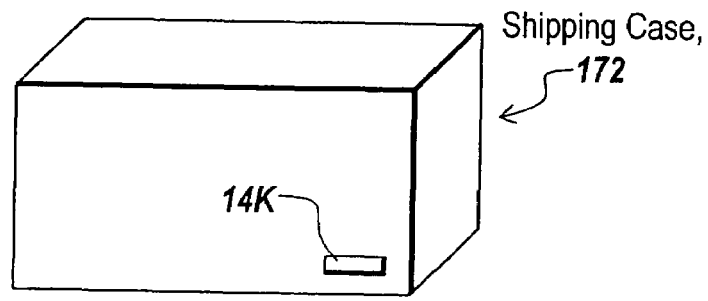
FIG. 17 is another illustrative exploded view of au electronic label according to the teachings of the present invention.

FIG. 17 illustrates and electronic label 14K of the present invention when used in conjunction with a shipping case 172. The shipping case 172 can be located at a loading dock or warehouse and can be mobile in nature. An electronic label 14K can be attached to the shipping case 172 using various permanent or temporary means as understood by those skilled in the art. The electronic label 14K can further display a visual indicator signifying the state, status, location or some combination thereof of the shipping case 172.

Figure 18:
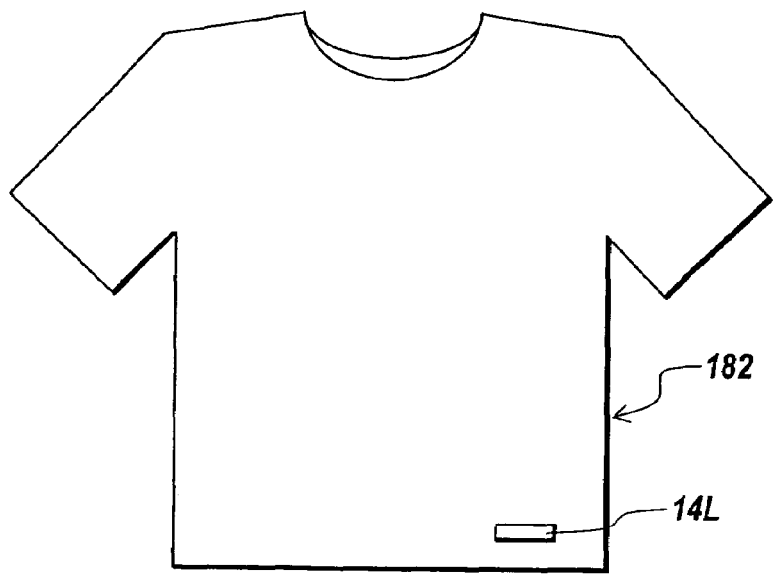
FIG. 18 is another illustrative exploded view of an electronic label according to the teachings of the present invention.

FIG. 18 illustrates and electronic label 14L of the present invention when used in conjunction with a consumer good 182. The electronic label 14L associated with the consumer good can display information such as price, manufacturing date, or washing instructions. The electronic display 14L associated with the consumer good 182 can further display an owner's name.

Figure 19:
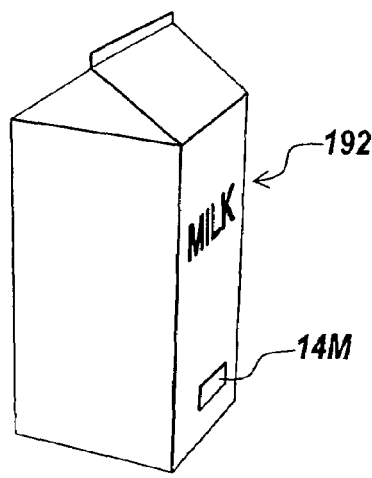
FIG. 19 is another illustrative exploded view of an electronic label according to the teachings of the present invention.

FIG. 19 illustrates and electronic label 14M of the present invention when used in conjunction with a perishable product 192. The electronic label 14M associated with the perishable product can display an expiration date, or can utilize a sensor associated with the electronic label 14M to display a graphical indicator is the perishable good has experienced a period without proper refrigeration.

Figure 20:
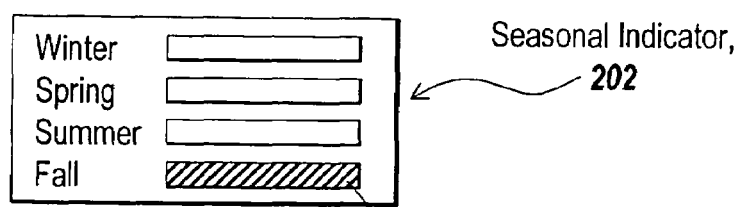
FIG. 20 is another illustrative exploded view of an electronic label according to the teachings of the present invention.

FIG. 20 illustrates and electronic label 14N of the present invention when used as a seasonal indicator 202. The seasonal indicator can incorporate an electronic label 14N wherein the electronic label can display a graphical indicator indicating the current season.

Figure 21:
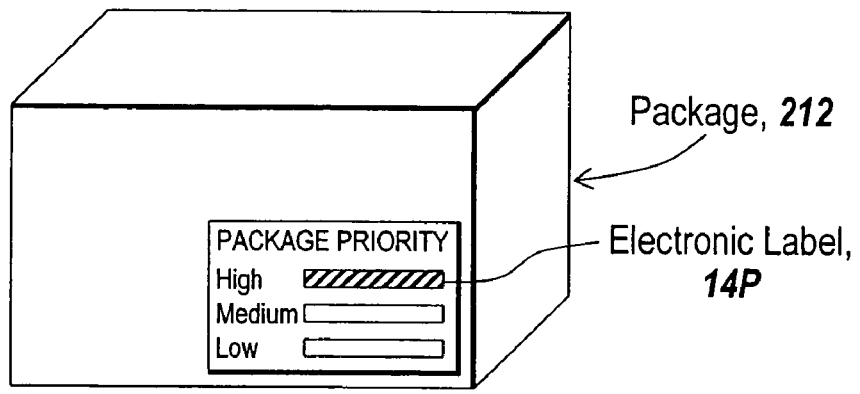
FIG. 21 is another illustrative exploded view of an electronic label according to the teachings of the present invention.

FIG. 21 illustrates an electronic label 14P of the present invention when used in conjunction with a package 222 to indicate package priority.

Figure 22:
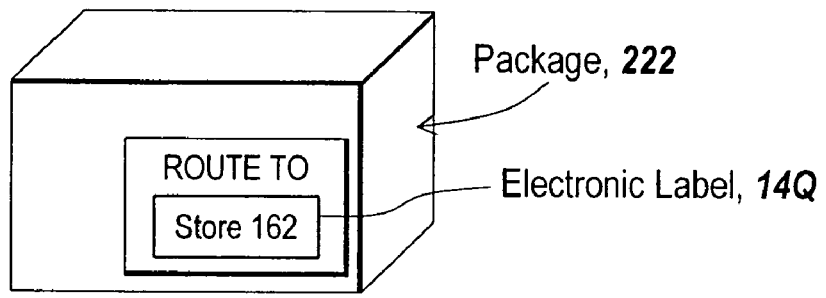
FIG. 22 is another illustrative exploded view of an electronic label according to the teachings of the present invention.

FIG. 22 illustrates an electronic label 14Q of the present invention when used in conjunction with a package 222 to indicate package routing information. Routing information displayed on the electronic label may be in a human readable form, or may be a machine readable form such as a barcode or matrix array.

Figure 23:
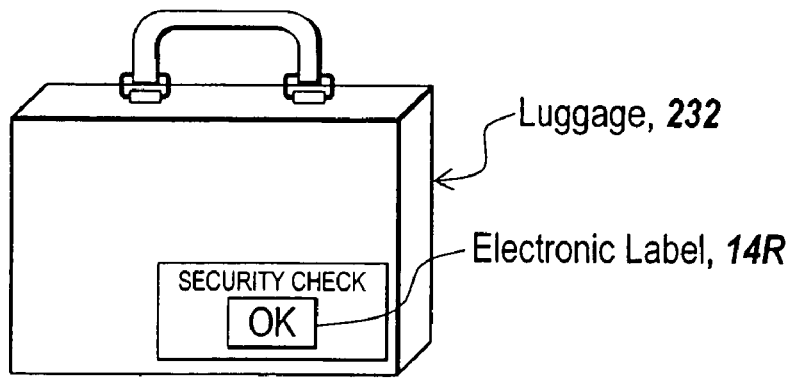
FIG. 23 is another illustrative exploded view of an electronic label according to the teachings of the present invention.

FIG. 23 illustrates an electronic label 14R of the present invention when used in conjunction with luggage 232 as a security check indicator. The electronic label 14R can display a variety of visual indicators to graphically depict if a piece of luggage 232 has been properly checked through security.

Figure 24:
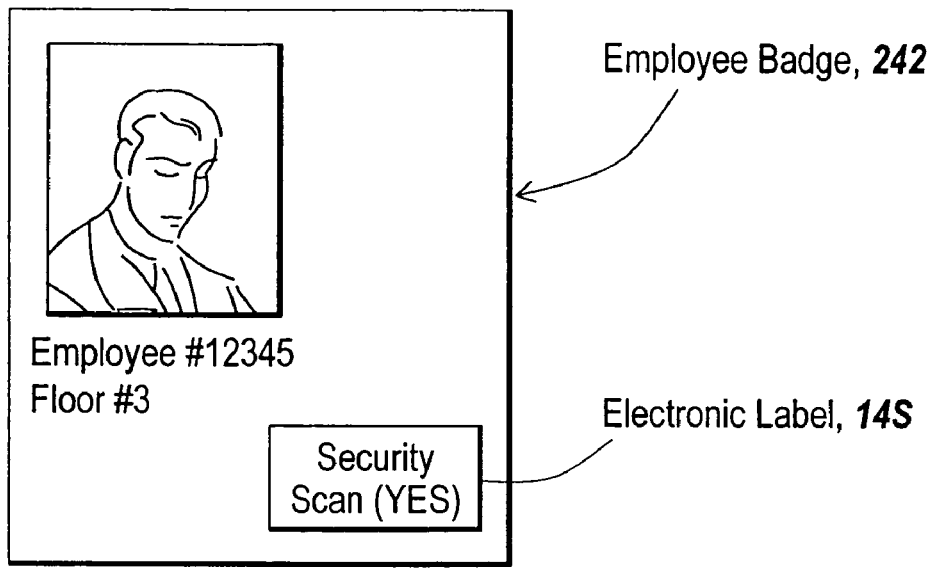
FIG. 24 is another illustrative exploded view of an electronic label according to the teachings of the present invention.

FIG. 24 illustrates an electronic label 14S of the present invention when used in conjunction with an employee badge 242. The electronic label 14S can display one or more graphical indicators relating to the security scan status of an employee badge 242.

Figure 25:
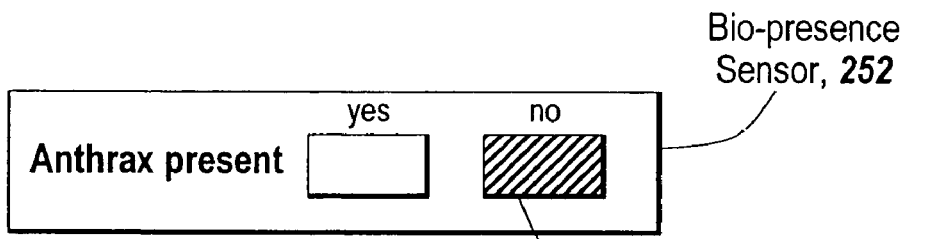
FIG. 25 is another illustrative exploded view of an electronic label according to the teachings of the present invention.

FIG. 25 illustrates an electronic label 14T of the present invention when used as a bio-presence sensor 252. The electronic label 14T can display one or more graphical indicators relating to the presence of a biological entity.

Figure 26:
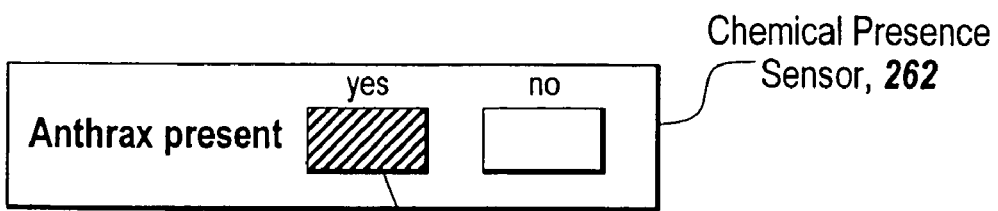
FIG. 26 is another illustrative exploded view of an electronic label according to the teachings of the present invention.

FIG. 26 illustrates an electronic label 14U of the present invention when used as a chemical presence sensor 262. The electronic label 14U can display one or more graphical indicators relating to the presence of a chemical composition.

Figure 27:
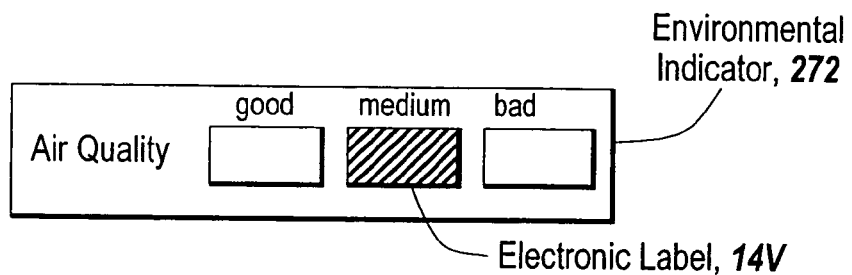
FIG. 27 is another illustrative exploded view of an electronic label according to the teachings of the present invention.

FIG. 27 illustrates an electronic label 14V of the present invention when used as an environmental indicator 272. The electronic label 14V can display one or more graphical indicators relating to the environmental factors such as the Ultraviolet index, pollen count, or air quality.

Figure 28:
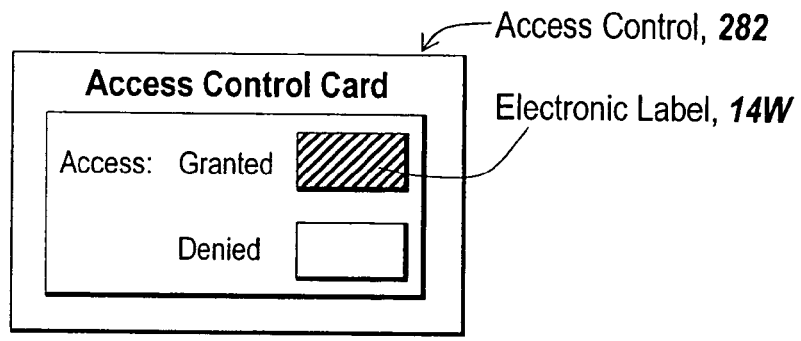
FIG. 28 is another illustrative exploded view of an electronic label according to the teachings of the present invention.

FIG. 28 illustrates an electronic label 14W of the present invention when used as an access control indicator in an access control setting 282. The electronic label 14W can display the state or status of the access control card.

Figure 29:
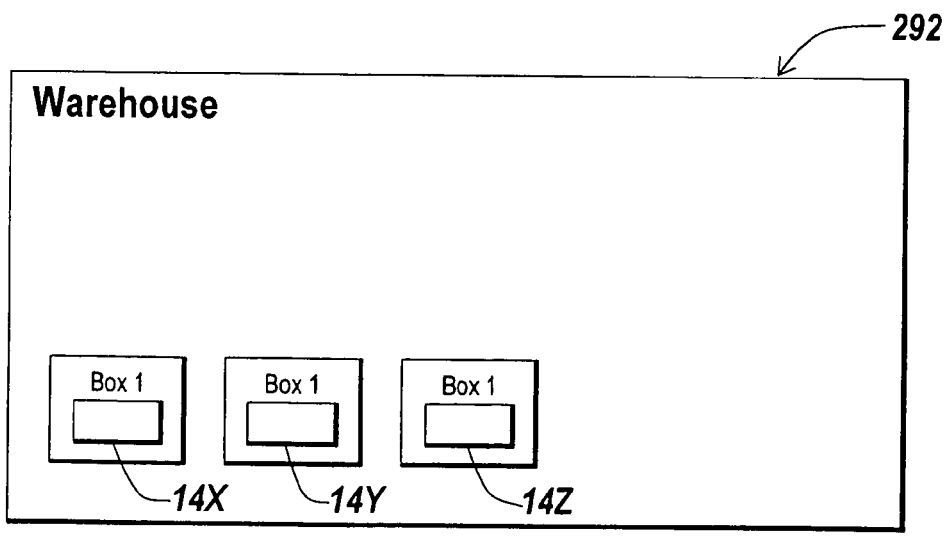
FIG. 29 is another illustrative exploded view of an electronic label according to the teachings of the present invention.

FIG. 29 illustrates electronic labels 14X, 14Y, 14Z of a present invention when used as part of a pick to light warehouse automation system. The electronic labels 14X, 14Y, 14Z of the present invention can be used in a warehouse 292, wherein the electronic labels 14X, 14Y, 14Z are associated with a plurality of items within the warehouse 292.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall there between.

What is claimed is:

1. An electronic-ink based Radio Frequency Identification (RFID) tag for attachment to a consumer item and displaying graphical indicia indicating whether or not said consumer item has been read and its integrated RFID module has been activated or deactivated, said electronic-ink based RFID tag comprising:

an addressable display label including a layer of electronic ink including a bi-stable non- volatile imaging material, capable of displaying graphical indicia on the display surface of said addressable display label, wherein said layer of electronic ink does not require electrical power to maintain the display of said graphical indicia;

an antenna structure for sending and/or receiving electromagnetic signals carrying information corresponding to at least one of instructions, programs, data, and graphical indicia to be displayed by said addressable display label;

a transceiver module, operably connected to said antenna structure, for transmitting electromagnetic signals from said antenna structure to a remote link by way of a wireless communication protocol, and receiving electromagnetic signals from said remote link using said antenna structure and said wireless communication protocol;

wherein said received electromagnetic signals carry information corresponding to at least one of said programs, said instructions, said data, and said graphical indicia to be displayed by said addressable display label;

an interface module, operably connected to said transceiver module, for (i) receiving at least one of said instructions, said programs, said data and said graphical indicia from said transceiver module, (ii) determining graphical indicia for display on said addressable display label, (iii) generating electrical signals for supply to said addressable display label, and (iv) providing to said transceiver module for transmission to said remote link using said antenna structure;

a storage module, operably connected to said interface module, for storing a unique identifier associated with said consumer item;

an RFID module, operably connected to said interface module, capable of being activated to indicate that the unique identifier associated said consumer item has not yet be read, and deactivated to indicate that the unique identifier associated said item has been read;

a battery power structure for supplying electrical power to said interface module and said transceiver module;

wherein said addressable display label, said transceiver module, said interface module, said antenna structure, said storage module and said RFID module are arranged and combined together in a unitary device;

wherein said interface module is responsive to electromagnetic signals received from said remote link by said antenna structure and said transceiver module; and wherein said addressable display label is responsive to electrical signals generated by said interface module, to display the determined graphical indicia on the display surface of said addressable display label;

wherein said interface module determines that said graphical indicia includes a first visual indicator displayed on said display surface, when said RFID module has been activated, to indicate that the unique identifier associated said consumer item has not yet be read; and wherein said interface module determines that said graphical indicia includes a second visual indicator displayed on said display surface, when said RFID module has been deactivated, to indicate that the unique identifier associated said consumer item has been read.

2. The electronic-ink based RFID tag of claim 1, which comprises a protection layer disposed over said layer of electronic ink in order to protect said addressable display label.

3. The electronic-ink based RFID tag of claim 1, wherein said electronic ink comprises an arrangement of microcapsules disposed in an electro-phoretic composition of a fluid and a suspension of material.

4. The electronic-ink based RFID tag of claim 1, wherein said graphical indicia displayed on said display surface is expressed in human and/or machine readable form.

5. The electronic-ink based RFID tag of claim 1, wherein said storage module comprises a non-volatile memory element.

6. The electronic-ink based RFID tag of claim 1, wherein said transmitted and received electromagnetic signals are radio frequency (RF) based electromagnetic signals transmitted and received, between said transceiver module and said remote link.

7. The electronic-ink based RFID tag of claim 1, which further comprises a database system operably connected to said remote link.

8. The electronic-ink based RFID tag of claim 7, wherein said remote link is in wireless communication with said electronic-ink based REID tag, by way of said wireless communication link.

9. The electronic-ink based RFID tag of claim 1, wherein said first visual indicator comprises a first graphical symbol, and wherein said second visual indicator comprises a second graphical symbol.

10. The electronic-ink based REID tag of claim 1, wherein said unique identifier is a universal product number.

11. An electronic-ink based Radio Frequency Identification (RFID) tag for attachment to a consumer item and displaying graphical indicia indicating whether or not said consumer item has been read and its integrated RFID module has been activated or deactivated, said electronic-ink based RFID tag comprising:

an addressable display label including a layer of electronic ink including a bi-stable non-volatile imaging material, capable of displaying graphical indicia on the display surface of said addressable display label, wherein said layer of electronic ink does not require electrical power to maintain the display of said graphical indicia;

an antenna structure for sending and/or receiving electromagnetic signals carrying information corresponding to at least one of instructions, programs, data, and graphical indicia to be displayed by said addressable display label;

a transceiver module, operably connected to said antenna structure, for transmitting electromagnetic signals from said antenna structure to a remote link by way of a wireless communication protocol, and receiving electromagnetic signals from said remote link using said antenna structure and said wireless communication protocol;

wherein said received electromagnetic signals carry information corresponding to at least one of said programs, said instructions, said data, and said graphical indicia to be displayed by said addressable display label;

an interface module, operably connected to said transceiver module, for (i) receiving at least one of said instructions, said programs, said data and said graphical indicia from said transceiver module, (ii) determining graphical indicia for display on said addressable display label, (iii) generating electrical signals for supply to said addressable display label, and (iv) providing data to said transceiver module for transmission to said remote link using said antenna structure;

a storage module, operably connected to said interface module, for storing a unique identifier associated with said consumer item;

an RFID module, operably connected to said interface module, capable of being activated to indicate that the unique identifier associated said consumer item has not yet be read, and deactivated to indicate that the unique identifier associated said item has been read;

an inductive coupling element for supplying electrical power from an external power source to said interface module and said transceiver module;

wherein said addressable display label, said transceiver module, said interface module, said antenna structure, said storage module and said RFID module are arranged and combined together in a unitary device;

wherein said interface module is responsive to electromagnetic signals received from said remote link using said antenna structure and said transceiver module; and wherein said addressable display label is responsive to electrical signals generated by said interface module, to display the determined graphical indicia on the display surface of said addressable display label;

wherein said interface module determines that said graphical indicia includes a first visual indicator displayed on said display surface, when said RFID module has been activated, to indicate that the unique identifier associated said consumer item has not yet be read; and wherein said interface module determines that said graphical indicia includes a second visual indicator displayed on said display surface, when said RFID module has been deactivated, to indicate that the unique identifier associated said consumer item has been read.

12. The electronic-ink based RFID tag of claim 11, which comprises a protection layer disposed over said layer of electronic ink in order to protect said addressable display label.

13. The electronic-ink based RFID tag of claim 11, wherein said electronic ink comprises an arrangement of microcapsules disposed in an electro-phoretic composition of a fluid and a suspension of material.

14. The electronic-ink based RFID tag of claim 11, wherein said graphical indicia displayed on said display surface is expressed in human and/or machine readable form.

15. The electronic-ink based RFID tag of claim 11, wherein said storage module comprises a non-volatile memory element.

16. The electronic-ink based RFID tag of claim 11, wherein said transmitted and received electromagnetic signals are radio frequency (RF) based electromagnetic signals transmitted and received between said transceiver module and said remote link.

17. The electronic-ink based RFID tag of claim 11, which further comprises a database system operably connected to said remote link.

18. The electronic-ink based RFID tag of claim 17, wherein said remote link is in wireless communication with said electronic-ink based RFID tag, by way of said wireless communication link.

19. The electronic-ink based RFID tag of claim 11, wherein said first visual indicator comprises a first graphical symbol, and wherein said second visual indicator comprises a second graphical symbol.

20. The electronic-ink based RFID tag of claim 11, wherein said unique identifier is a universal product number.

21. The electronic-ink based RFID tag of claim 11, which further comprises an on-board battery source for supplying electrical power to said interface module and said transceiver module, supplemented by electrical power provided by said inductive power coupling element.

22. The electronic-ink based RFID tag of claim 11, wherein said graphical indicia is used in inventory management and supply chain tracking operations, and said second visual indicator indicates that said consumer item has been successfully scanned and entered into inventory.

* * * * *